(12) United States Patent
Al-Ghamdi et al.

(10) Patent No.: US 11,352,573 B2
(45) Date of Patent: Jun. 7, 2022

(54) HIGH-SEVERITY FLUIDIZED CATALYTIC CRACKING SYSTEMS AND PROCESSES HAVING PARTIAL CATALYST RECYCLE

(71) Applicant: Saudi Arabian Oil Company, Dhahran (SA)

(72) Inventors: Sameer A. Al-Ghamdi, Dhahran (SA); Saad Al-Bogami, Dammam (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/083,439

(22) Filed: Oct. 29, 2020

(65) Prior Publication Data

US 2021/0040398 A1     Feb. 11, 2021

Related U.S. Application Data

(63) Continuation of application No. 15/945,362, filed on Apr. 4, 2018, now Pat. No. 10,870,802.
    (Continued)

(51) Int. Cl.
   *C10G 51/02*      (2006.01)
   *C10G 11/18*      (2006.01)
   (Continued)

(52) U.S. Cl.
   CPC ............ *C10G 51/02* (2013.01); *B01D 3/143* (2013.01); *B01J 8/1809* (2013.01); *B01J 8/26* (2013.01);
   (Continued)

(58) Field of Classification Search
   CPC .... C10G 51/02; C10G 11/182; C10G 11/187; C10G 51/06; C10G 7/00; C10G 11/04;
   (Continued)

(56) References Cited

U.S. PATENT DOCUMENTS 977,228 A    11/1910  Schestopol
2,882,218 A   4/1959  Jewell
              (Continued)

FOREIGN PATENT DOCUMENTS

CN       1710029 A    12/2005
CN     102925210 A     2/2013
              (Continued)

OTHER PUBLICATIONS

Corma, "A new continuous laboratory reactor for the study of catalytic cracking", Applied Catalysis A: General 232, pp. 247-263, 2002.
              (Continued)

*Primary Examiner* — Randy Boyer
*Assistant Examiner* — Juan C Valencia
(74) *Attorney, Agent, or Firm* — Dinsmore & Shohl LLP

(57) ABSTRACT

Methods for operating a system having two downflow high-severity FCC units for producing products from a hydrocarbon feed includes introducing the hydrocarbon feed to a feed separator and separating it into a lesser boiling point fraction and a greater boiling point fraction. The greater boiling point fraction is passed to the first FCC unit and cracked in the presence of a first catalyst at 500° C. to 700° C. to produce a first cracking reaction product and a spent first catalyst. The lesser boiling point fraction is passed to the second FCC unit and cracked in the presence of a second catalyst at 500° C. to 700° C. to produce a second cracking reaction product and a spent second catalyst. At least a portion of the spent first catalyst or the spent second catalyst is passed back to the first FCC unit, the second FCC unit or both.

18 Claims, 5 Drawing Sheets

Related U.S. Application Data

(60) Provisional application No. 62/512,840, filed on May 31, 2017.

(51) Int. Cl.
  *B01J 8/18* (2006.01)
  *B01J 8/26* (2006.01)
  *C10G 51/06* (2006.01)
  *B01D 3/14* (2006.01)
  *B01J 38/38* (2006.01)
  *C10G 7/00* (2006.01)
  *C10G 11/04* (2006.01)

(52) U.S. Cl.
  CPC ............... *B01J 38/38* (2013.01); *C10G 7/00* (2013.01); *C10G 11/04* (2013.01); *C10G 11/182* (2013.01); *C10G 11/187* (2013.01); *C10G 51/06* (2013.01); *B01J 2208/00628* (2013.01); *C10G 2300/107* (2013.01); *C10G 2300/1048* (2013.01); *C10G 2300/1077* (2013.01); *C10G 2300/4081* (2013.01); *C10G 2300/708* (2013.01); *C10G 2400/16* (2013.01); *C10G 2400/20* (2013.01); *C10G 2400/22* (2013.01)

(58) Field of Classification Search
  CPC .... C10G 2300/4081; C10G 2300/1048; C10G 2300/107; C10G 2300/1077; C10G 2300/708; C10G 2400/16; C10G 2400/20; C10G 2400/22; B01J 8/1809; B01J 8/26; B01J 38/38; B01J 2208/00628; B01D 3/143
  See application file for complete search history.

(56) References Cited

U.S. PATENT DOCUMENTS

| | | |
|---|---|---|
| 3,074,878 A | 1/1963 | Pappas |
| 3,835,029 A | 9/1974 | Larson |
| 3,837,822 A | 9/1974 | Ward |
| 3,856,659 A | 12/1974 | Owen |
| 3,888,762 A | 6/1975 | Gerhold |
| 4,090,949 A | 5/1978 | Owen et al. |
| 4,297,203 A | 10/1981 | Ford et al. |
| 4,417,975 A | 11/1983 | Myers |
| 4,419,221 A | 12/1983 | Castagnos et al. |
| 4,436,613 A | 3/1984 | Sayles et al. |
| 4,464,250 A | 8/1984 | Myers et al. |
| 4,606,810 A | 8/1986 | Krambeck et al. |
| 4,830,728 A | 5/1989 | Herbst et al. |
| 4,980,053 A | 12/1990 | Li et al. |
| 4,992,160 A | 2/1991 | Long et al. |
| 5,026,935 A | 6/1991 | Leyshon et al. |
| 5,026,936 A | 6/1991 | Leyshon et al. |
| 5,043,522 A | 8/1991 | Leyshon et al. |
| 5,154,818 A | 10/1992 | Harandi et al. |
| 5,158,919 A | 10/1992 | Haddad et al. |
| 5,160,424 A | 11/1992 | Le et al. |
| 5,171,921 A | 12/1992 | Gaffney et al. |
| 5,232,580 A | 8/1993 | Le et al. |
| 5,232,675 A | 8/1993 | Shu et al. |
| 5,318,689 A | 6/1994 | Hsing et al. |
| 5,326,465 A | 7/1994 | Yongqing et al. |
| 5,334,554 A | 8/1994 | Lin et al. |
| 5,372,704 A | 12/1994 | Harandi et al. |
| 5,380,690 A | 1/1995 | Zhicheng et al. |
| 5,451,313 A | 9/1995 | Wegerer et al. |
| 5,462,652 A | 10/1995 | Wegerer |
| 5,523,502 A | 6/1996 | Rubin |
| 5,549,813 A | 8/1996 | Dai et al. |
| 5,589,139 A | 12/1996 | Zinke et al. |
| 5,597,537 A | 1/1997 | Wegerer et al. |
| 5,637,207 A | 6/1997 | Hsing et al. |
| 5,670,037 A | 9/1997 | Zaiting et al. |
| 5,685,972 A | 11/1997 | Timken et al. |
| 5,730,859 A | 3/1998 | Johnson et al. |
| 5,770,042 A | 6/1998 | Galperin et al. |
| 5,858,207 A | 1/1999 | Lomas |
| 5,904,837 A | 5/1999 | Fujiyama |
| 5,951,850 A | 9/1999 | Ino et al. |
| 5,976,356 A | 11/1999 | Drake et al. |
| 5,993,642 A | 11/1999 | Mohr et al. |
| 6,015,933 A | 1/2000 | Abrevaya et al. |
| 6,069,287 A | 5/2000 | Ladwig et al. |
| 6,113,776 A * | 9/2000 | Upson ............... C10G 11/18 208/113 |
| 6,210,562 B1 | 4/2001 | Xie et al. |
| 6,287,522 B1 | 9/2001 | Lomas |
| 6,288,298 B1 | 9/2001 | Rodriguez et al. |
| 6,300,537 B1 | 10/2001 | Strohmaier et al. |
| 6,315,890 B1 | 11/2001 | Ladwig et al. |
| 6,420,621 B2 | 7/2002 | Sha et al. |
| 6,455,750 B1 | 9/2002 | Steffens et al. |
| 6,521,563 B2 | 2/2003 | Strohmaier et al. |
| 6,548,725 B2 | 4/2003 | Froment et al. |
| 6,566,293 B1 | 5/2003 | Vogt et al. |
| 6,602,403 B1 | 8/2003 | Steffens et al. |
| 6,652,737 B2 | 11/2003 | Touvelle et al. |
| 6,656,345 B1 | 12/2003 | Chen et al. |
| 6,656,346 B2 | 12/2003 | Ino et al. |
| 6,784,329 B2 | 8/2004 | O'Rear et al. |
| 6,867,341 B1 | 3/2005 | Abrevaya et al. |
| 6,979,755 B2 | 12/2005 | O'Rear et al. |
| 7,019,187 B2 | 3/2006 | Powers |
| 7,029,571 B1 | 4/2006 | Bhattacharyya et al. |
| 7,087,154 B2 | 8/2006 | Pinho et al. |
| 7,087,155 B1 | 8/2006 | Dath et al. |
| 7,128,827 B2 | 10/2006 | Tallman et al. |
| 7,153,479 B2 | 12/2006 | Peterson et al. |
| 7,169,293 B2 | 1/2007 | Lomas et al. |
| 7,220,351 B1 | 5/2007 | Pontier et al. |
| 7,261,807 B2 | 8/2007 | Henry et al. |
| 7,270,739 B2 | 9/2007 | Chen et al. |
| 7,312,370 B2 | 12/2007 | Pittman et al. |
| 7,314,964 B2 | 1/2008 | Abrevaya et al. |
| 7,326,332 B2 | 2/2008 | Chen et al. |
| 7,374,660 B2 | 5/2008 | Steffens et al. |
| 7,459,596 B1 | 12/2008 | Abrevaya et al. |
| 7,479,218 B2 | 1/2009 | Letzsch |
| 7,686,942 B2 | 3/2010 | Xie et al. |
| 7,906,077 B2 | 3/2011 | Sandacz |
| 7,935,654 B2 | 5/2011 | Choi et al. |
| 8,137,533 B2 | 3/2012 | Towler et al. |
| 8,247,631 B2 | 8/2012 | Nicholas et al. |
| 8,614,160 B2 | 12/2013 | Upson et al. |
| 8,864,979 B2 | 10/2014 | Palmas |
| 8,933,286 B2 | 1/2015 | Souza et al. |
| 9,096,806 B2 | 8/2015 | Abba et al. |
| 9,101,854 B2 | 8/2015 | Koseoglu et al. |
| 9,290,705 B2 | 3/2016 | Bourane et al. |
| 9,783,749 B2 | 10/2017 | Davydov |
| 9,816,037 B2 | 11/2017 | Avais |
| 2001/0042700 A1 | 11/2001 | Swan, III et al. |
| 2001/0056217 A1 | 12/2001 | Froment et al. |
| 2002/0003103 A1 | 1/2002 | Henry et al. |
| 2003/0220530 A1 | 11/2003 | Boelt et al. |
| 2005/0070422 A1 | 3/2005 | Chen et al. |
| 2005/0150817 A1 | 7/2005 | Tallman et al. |
| 2006/0108260 A1 | 5/2006 | Henry |
| 2008/0011644 A1 | 1/2008 | Dean et al. |
| 2008/0011645 A1 | 1/2008 | Dean |
| 2008/0035527 A1 | 2/2008 | Eng et al. |
| 2008/0044611 A1 | 2/2008 | Husemann et al. |
| 2009/0012339 A1 | 1/2009 | Choi et al. |
| 2009/0112035 A1 | 4/2009 | Choi et al. |
| 2009/0288990 A1 | 11/2009 | Xie et al. |
| 2011/0139679 A1 | 6/2011 | Bories et al. |
| 2012/0241359 A1 | 9/2012 | Al-Thubaiti et al. |
| 2013/0001130 A1 * | 1/2013 | Mo ............... C10G 11/18 208/79 |
| 2013/0056393 A1 | 3/2013 | Subramani et al. |

(56) References Cited

U.S. PATENT DOCUMENTS

| | | | |
|---|---|---|---|
| 2013/0172643 A1* | 7/2013 | Pradeep | C10G 51/026 585/310 |
| 2013/0248420 A1 | 9/2013 | Palmas | |
| 2013/0248421 A1 | 9/2013 | Abba et al. | |
| 2014/0110308 A1* | 4/2014 | Bourane | C10G 11/18 208/80 |
| 2014/0228205 A1 | 8/2014 | Narayanaswamy et al. | |
| 2015/0094511 A1 | 4/2015 | Bastianti et al. | |
| 2016/0333280 A1 | 11/2016 | Subramani et al. | |
| 2017/0130140 A1 | 5/2017 | Bhanuprasad et al. | |
| 2017/0190991 A1 | 7/2017 | Sundberg et al. | |
| 2018/0057758 A1 | 3/2018 | Al-Ghamdi et al. | |
| 2018/0079974 A1 | 3/2018 | Kokayeff et al. | |
| 2018/0142167 A1 | 5/2018 | Al-Ghamdi et al. | |
| 2018/0223193 A1 | 8/2018 | Kukade et al. | |
| 2018/0305623 A1 | 10/2018 | Al-Ghrami et al. | |
| 2018/0327677 A1 | 11/2018 | Ding et al. | |
| 2018/0346827 A1 | 12/2018 | Al-Ghamdi et al. | |
| 2019/0119586 A1 | 4/2019 | Gong et al. | |
| 2019/0225894 A1 | 7/2019 | Bourane et al. | |
| 2020/0255753 A1 | 8/2020 | Al-Herz et al. | |
| 2021/0047573 A1 | 2/2021 | Bourane et al. | |

FOREIGN PATENT DOCUMENTS

| | | |
|---|---|---|
| CN | 104903427 A | 9/2015 |
| EP | 315179 A1 | 5/1989 |
| EP | 2688982 A1 | 1/2014 |
| GB | 978576 | 12/1964 |
| WO | 2010053482 A1 | 5/2010 |
| WO | 2012128973 A1 | 9/2012 |
| WO | 2019106921 A1 | 6/2019 |

OTHER PUBLICATIONS

International Search Report and Written Opinion pertaining to International Application PCT/US2018/030858 dated May 3, 2018.

Corma et al., "Different process schemes for converting light straight run and fluid catalytic cracing naphthas in a FCC unit for maximum propylene production", Applied Catalyst A: General 265, pp. 195-206, 2004.

Verstraete et al., "Study of direct and indirect naphtha recycling to a resid FCC unit for maximum propylene production". Catalysis Today, 106, pp. 62-71, 2005.

Examination Report pertaining to Application No. GC2018-35391 dated Nov. 27, 2019.

Office Action dated Nov. 15, 2019 pertaining to U.S. Appl. No. 16/244,181, filed Jan. 10, 2019, 41 pgs.

International Search Report and Written Opinion dated Apr. 4, 2019 pertaining to International application No. PCT/US2019/013978 filed Jan. 17, 2019, 19 pgs.

Office Action dated May 26, 2020 pertaining to U.S. Appl. No. 16/244,181, filed Jan. 10, 2019, 22 pgs.

Corma et al., "Steam catalytic cracking of naphtha over ZSM-5 zeolite for production of propene and ethene: Micro and mascroscopic implications of the presence of steam", Applied Catalysis A: General 417-418, pp. 220-235, 2012.

Office Action pertaining to Chinese Patent Application No. 201880034389.8 dated Apr. 16, 2021.

Office Action dated Mar. 16, 2021 pertaining to U.S. Appl. No. 17/009,073, filed Sep. 1, 2020, 27 pgs.

International Search Report and Written Opinion dated Jun. 16, 2021 pertaining to International application No. PCT/US2021/015030 filed Jan. 26, 2021, 15 pages.

Office Action dated Jul. 6, 2021 pertaining to U.S. Appl. No. 17/009,020, filed Sep. 1, 2020, 41 pages.

Office Action dated Jul. 2, 2021 pertaining to U.S. Appl. No. 17/009,073, filed Sep. 1, 2020, 18 pages.

International Search Report and Written Opinion dated May 3, 2021 pertaining to International application No. PCT/US2021/015012 filed Jan. 26, 2021, 12 pages.

International Search Report and Written Opinion dated May 3, 2021 pertaining to International application No. PCT/US2021/015007 filed Jan. 26, 2021, 15 pages.

International Search Report and Written Opinion dated May 3, 2021 pertaining to International application No. PCT/US2021/015010 filed Jan. 26, 2021, 13 pages.

Office Action dated Jun. 7, 2021 pertaining to U.S. Appl. No. 17/009,008, filed Sep. 1, 2020, 28 pages.

International Search Report and Written Opinion dated May 10, 2021 pertaining to International application No. PCT/US2021/015013 filed Jan. 26, 2021, 14 pages.

International Search Report and Written Opinion dated May 10, 2021 pertaining to International application No. PCT/US2021/015035 filed Jan. 26, 2021, 15 pages.

International Search Report and Written Opinion dated May 10, 2021 pertaining to International application No. PCT/US2021/015019 filed Jan. 26, 2021, 15 pages.

Office Action dated Jun. 8, 2021 pertaining to U.S. Appl. No. 17/009,048, filed Sep. 1, 2020, 28 pages.

Office Action dated Jun. 10, 2021 pertaining to U.S. Appl. No. 17/009,039, filed Sep. 1, 2020, 39 pages.

Office Action dated May 26, 2021 pertaining to U.S. Appl. No. 17/009,012, filed Sep. 1, 2020, 37 pages.

* cited by examiner

HIGH-SEVERITY FLUIDIZED CATALYTIC CRACKING SYSTEMS AND PROCESSES HAVING PARTIAL CATALYST RECYCLE

CROSS-REFERENCE TO RELATED APPLICATIONS

The present application is a continuation application of U.S. application Ser. No. 15/945,362 filed on Apr. 4, 2018, which claims priority to U.S. Provisional Application Ser. No. 62/512,840 filed on May 31, 2017, each of which are incorporated by reference herein.

TECHNICAL FIELD

Embodiments of the present disclosure generally relate to fluid catalytic cracking processes, and more specifically relate to high-severity fluid catalytic cracking (HSFCC) systems.

BACKGROUND

Ethylene, propene, butene, butadiene, and aromatics compounds such as benzene, toluene and xylenes are basic intermediates for a large proportion of the petrochemical industry. They are usually obtained through the thermal cracking (or steam pyrolysis) of petroleum gases and distillates such as naphtha, kerosene or even gas oil. These compounds are also produced through refinery fluidized catalytic cracking (FCC) process where classical heavy feedstocks such as gas oils or residues are converted. Typical FCC feedstocks range from hydrocracked bottoms to heavy feed fractions such as vacuum gas oil and atmospheric residue; however, these feedstocks are limited. The second most important source for propene production is currently refinery propene from FCC units. With the ever growing demand, FCC unit owners look increasingly to the petrochemicals market to boost their revenues by taking advantage of economic opportunities that arise in the propene market.

The worldwide increasing demand for light olefins remains a major challenge for many integrated refineries. In particular, the production of some valuable light olefins such as ethylene, propene, and butene has attracted increased attention as pure olefin streams are considered the building blocks for polymer synthesis. The production of light olefins depends on several process variables like the feed type, operating conditions, and the type of catalyst. Despite the options available for producing a greater yield of propene and light olefins, intense research activity in this field is still being conducted. These options include the use of HSFCC systems, developing more selective catalysts for the process, and enhancing the configuration of the process in favor of more advantageous reaction conditions and yields. The HSFCC process is capable of producing yields of propene up to four times greater than the traditional fluid catalytic cracking unit and greater conversion levels for a range of petroleum steams.

SUMMARY

Embodiments of the present disclosure are directed to HSFCC systems and methods for producing one or more petrochemical products from a hydrocarbon material, such as a crude oil. In particular, embodiments are directed to HSFCC systems and methods that include spent catalyst recycle back to the cracking reaction zones.

Typical HSFCC systems having common catalyst regenerators generally require that both of the FCC units of the HSFCC system operate with the same regenerated catalyst having the same catalyst temperature. Feeding the same regenerated catalyst to each FCC reactor may result in the same reaction temperature in each of the FCC reactors. However, hydrocarbon feedstocks, such as crude oil for example, may have a wide range of compositions and boiling points. Thus, having the same reaction conditions in each of the FCC reactors may adversely impact the yield of petrochemical products from one or both of the FCC units of the HSFCC system.

According to embodiments, the HSFCC systems and methods described in this disclosure may include recycling spent catalyst back to the cracking reaction zones. Recycling the spent catalyst and controlling the ratio of the spent catalyst to the regenerated catalyst introduced to a cracking reaction zone may enable separate control of the average catalytic activity of the catalyst in each of the cracking reaction zones to suit the fractions of the hydrocarbon feed processed in each of the cracking reaction zones. Controlling the catalytic activity in each cracking reaction zone may improve the yield of light olefins and overall conversion in the FCC unit. Further, combining spent catalyst with regenerated catalyst may reduce the temperature of the cracking reaction zone, which may improve the olefin selectivity of the HSFCC system.

According to some embodiments, a method for operating a system having a first fluid catalytic cracking (FCC) unit and a second FCC unit for producing products from a hydrocarbon feed stream may comprise introducing a hydrocarbon feed stream to a feed separator, separating the hydrocarbon feed stream into a lesser boiling point fraction and a greater boiling point fraction in the feed separator, passing the greater boiling point fraction to the first FCC unit, and passing the lesser boiling point fraction to the second FCC unit, where the first FCC unit and the second FCC unit are downflow FCC units. The method may further include cracking at least a portion of the greater boiling point fraction in the first FCC unit in the presence of a first catalyst at a first cracking temperature of from 500° C. to 700° C. to produce a first cracking reaction product and a spent first catalyst, cracking at least a portion of the lesser boiling point fraction in the second FCC unit in the presence of a second catalyst and at a second cracking temperature of from 500° C. to 700° C. to produce a second cracking reaction product and a spent second catalyst.

According to other embodiments, a method for producing olefins, may comprise separating a hydrocarbon material into a lesser boiling point fraction and a greater boiling point fraction, cracking at least a portion of the greater boiling point fraction in the presence of a first catalyst at a first cracking temperature of from 500° C. to 700° C. to produce a first cracking reaction product and a spent first catalyst, and cracking at least a portion of the lesser boiling point fraction in the presence of a second catalyst at a second cracking temperature of from 500° C. to 700° C. to produce a second cracking reaction product and a spent second catalyst. The method may further comprise separating at least a portion of the first cracking reaction product from the spent first catalyst, separating at least a portion of the second cracking reaction product from the spent second catalyst, combining a first portion of the spent first catalyst and a regenerated catalyst to produce the first catalyst or the second catalyst, and recovering the first cracking reaction product and the second cracking reaction product.

According to still other embodiments, a system for producing olefins from crude oil may comprise a first FCC unit comprising a first cracking reaction zone, the first cracking reaction zone being a downflow cracking reaction zone, a first separation zone downstream of the first FCC unit, a second FCC unit in parallel with the first FCC unit and comprising a second cracking reaction zone, the second cracking reaction zone being a downflow cracking reaction zone, a second separation zone downstream of the second FCC unit, and a regeneration zone downstream of the first separation zone and the second separation zone and fluidly coupled to the first separation zone and the second separation zone. The system may further comprise a catalyst recycle fluidly coupling the first separation zone or the second separation zone to the first FCC unit, the second FCC unit, or the first FCC unit and the second FCC unit.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
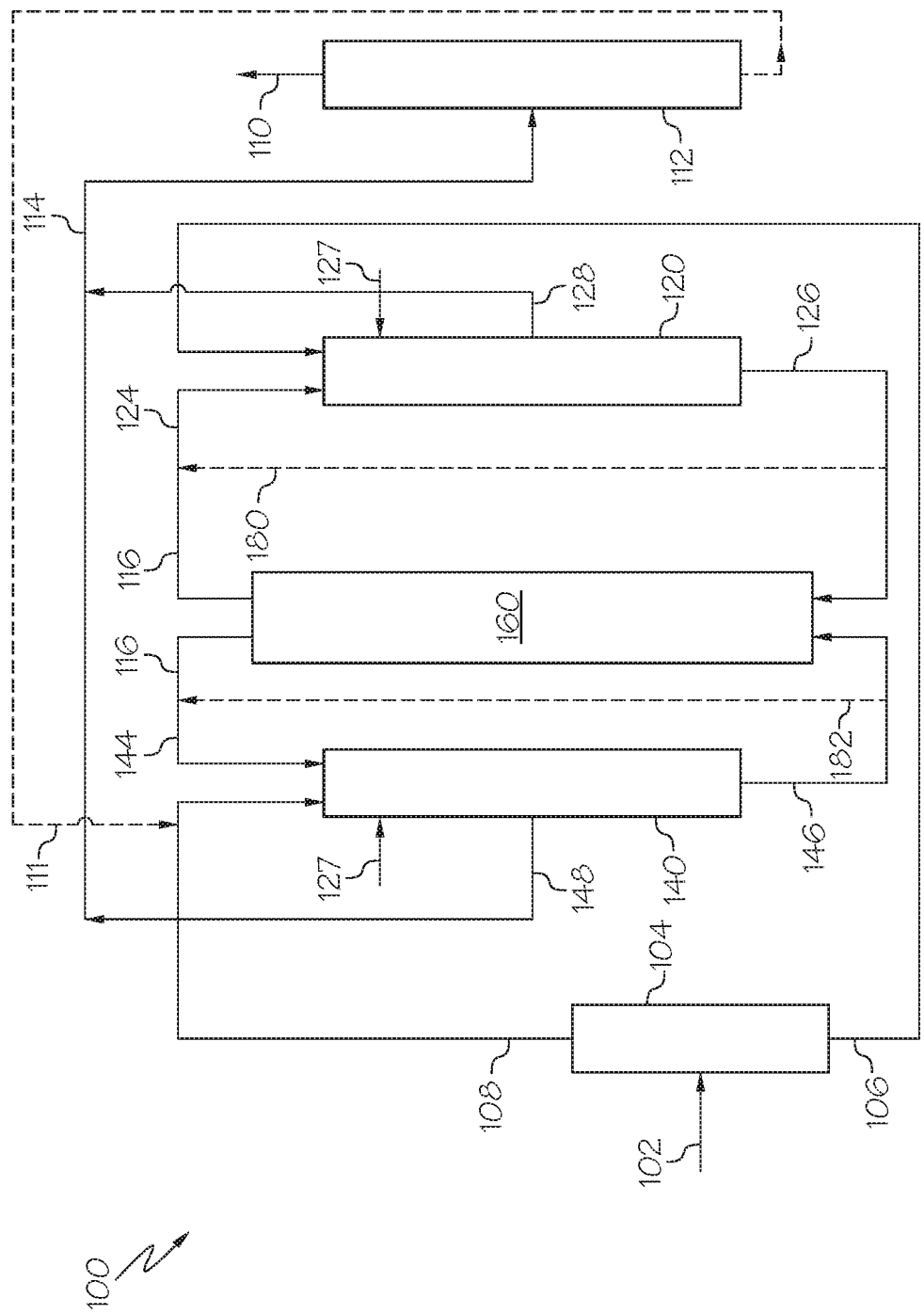
FIG. 1 is a generalized schematic diagram of an embodiment of a HSFCC system, according to one or more embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-5. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and processes for converting one or more hydrocarbon feed streams into one or more petrochemical products using a high-severity fluidized catalytic cracking (HSFCC) system that includes two downflow fluid catalytic cracking (FCC) units operated at high-severity conditions. For example, a method for operating a system having a first FCC unit and a second FCC unit may include introducing the hydrocarbon feed stream to a feed separator and separating the hydrocarbon feed stream into a lesser boiling point fraction and a greater boiling point fraction in the feed separator. The method may further include passing the greater boiling point fraction to the first FCC unit and cracking at least a portion of the greater boiling point fraction in the first FCC unit in the presence of a first catalyst at a first cracking temperature of from 500° C. to 700° C. to produce a first cracking reaction product and a spent first catalyst. The method may include passing the lesser boiling point fraction to the second FCC unit and cracking at least a portion of the lesser boiling point fraction in the second FCC unit in the presence of a second catalyst at a second cracking temperature of from 500° C. to 700° C. to produce a second cracking reaction product and a spent second catalyst. The first FCC unit and the second FCC unit may be downflow FCC units operated at high severity conditions. The method may further include passing at least a portion of the spent first catalyst or a portion of the spent second catalyst to the first FCC unit or the second FCC unit. Passing at least a portion of the spent first catalyst or at least a portion of the spent second catalyst back to the first FCC unit or the second FCC unit may reduce the temperature and catalytic activity of the first catalyst or second catalyst in the first FCC unit or the second FCC unit, respectively. The amount of spent first or second catalyst recycled to the FCC units may enable control of the activity in one or both of the FCC units to modify the composition of the first cracking reaction product, second cracking reaction product, or both. The HSFCC system 100 may be used to convert a crude oil feed material into at least one petrochemical product, non-limiting examples of which may include olefins or gasolines.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction" (sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as an "intermediate boiling point fraction."

As used in this disclosure, the term "high-severity conditions" generally refers to FCC temperatures of 500° C. or greater, a weight ratio of catalyst to hydrocarbon (catalyst to oil ratio) of equal to or greater than 5:1, and a residence time of less than 3 seconds, all of which may be more severe than typical FCC reaction conditions.

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, a "catalyst" refers to any substance which increases the rate of a specific chemical reaction. Catalysts described in this disclosure may be utilized to promote various reactions, such as, but not limited to, cracking (including aromatic cracking), demetalization, desulfurization, and denitrogenation. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

As used in this disclosure, the term "first catalyst" refers to catalyst that is introduced to the first cracking reaction zone, such as the catalyst passed from the first catalyst/feed mixing zone to the first cracking reaction zone. The first catalyst may include at least one of regenerated catalyst, spent first catalyst, spent second catalyst, fresh catalyst, or combinations of these. As used in this disclosure, the term "second catalyst" refers to catalyst that is introduced to the second cracking reaction zone, such as the catalyst passed from the second catalyst/feed mixing zone to the second cracking reaction zone for example. The second catalyst may include at least one of regenerated catalyst, spent first catalyst, spent second catalyst, fresh catalyst, or combinations of these.

As used in this disclosure, the term "spent catalyst" refers to catalyst that has been introduced to and passed through a cracking reaction zone to crack a hydrocarbon material, such as the greater boiling point fraction or the lesser boiling point fraction for example, but has not been regenerated in the regenerator following introduction to the cracking reaction zone. The "spent catalyst" may have coke deposited on the catalyst and may include partially coked catalyst as well as fully coked catalysts. The amount of coke deposited on the "spent catalyst" may be greater than the amount of coke remaining on the regenerated catalyst following regeneration.

As used in this disclosure, the term "regenerated catalyst" refers to catalyst that has been introduced to a cracking reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lesser catalytic activity compared to fresh catalyst that has not passed through a cracking reaction zone and regenerator.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "greater boiling point fraction stream" passing from a first system component to a second system component should be understood to equivalently disclose the "greater boiling point fraction" passing from a first system component to a second system component.

The hydrocarbon feed stream may generally comprise a hydrocarbon material. In embodiments, the hydrocarbon material of the hydrocarbon feed stream may be crude oil. As used in this disclosure, the term "crude oil" is to be understood to mean a mixture of petroleum liquids and gases, including impurities such as sulfur-containing compounds, nitrogen-containing compounds and metal compounds, as distinguished from fractions of crude oil. In certain embodiments the crude oil feedstock may be a minimally treated light crude oil to provide a crude oil feedstock having total metals (Ni+V) content of less than 5 parts per million by weight (ppmw) and Conradson carbon residue of less than 5 wt %.

While the present description and examples may specify crude oil as the hydrocarbon material of the hydrocarbon feed stream 102, it should be understood that the hydrocarbon feed conversion systems 100 described with respect to the embodiments of FIGS. 1-5, respectively, may be applicable for the conversion of a wide variety of hydrocarbon materials, which may be present in the hydrocarbon feed stream 102, including, but not limited to, crude oil, vacuum residue, tar sands, bitumen, atmospheric residue, vacuum gas oils, demetalized oils, naphtha streams, other hydrocarbon streams, or combinations of these materials. The hydrocarbon feed stream 102 may include one or more non-hydrocarbon constituents, such as one or more heavy metals, sulphur compounds, nitrogen compounds, inorganic components, or other non-hydrocarbon compounds. If the hydrocarbon feed stream 102 is crude oil, it may have an American Petroleum Institute (API) gravity of from 22 degrees to 40 degrees. For example, the hydrocarbon feed stream 102 utilized may be an Arab heavy crude oil. Example properties for one particular exemplary grade of Arab heavy crude oil are provided subsequently in Table 1. It should be understood that, as used in this disclosure, a "hydrocarbon feed" may refer to a raw hydrocarbon material which has not been previously treated, separated, or otherwise refined (such as crude oil) or may refer to a hydrocarbon material which has undergone some degree of processing, such as treatment, separation, reaction, purifying, or other operation, prior to being introduced to the HSFCC system 100 in the hydrocarbon feed stream 102.

TABLE 1

Example of Arab Heavy Export Feedstock

| Analysis | Units | Value |
|---|---|---|
| American Petroleum Institute (API) gravity | degree | 27 |
| Density | grams per cubic centimeter ($g/cm^3$) | 0.8904 |
| Sulfur Content | weight percent (wt. %) | 2.83 |
| Nickel | parts per million by weight (ppmw) | 16.4 |
| Vanadium | ppmw | 56.4 |
| Sodium Chloride (NaCl) Content | ppmw | <5 |
| Conradson Carbon Residue (CCR) | wt. % | 8.2 |
| $C_5$ Asphaltenes | wt. % | 7.8 |
| $C_7$ Asphaltenes | wt. % | 4.2 |

In general terms, the HSFCC system 100 includes two FCC units in each of which a portion of the hydrocarbon feed stream 102 contacts heated fluidized catalytic particles in a cracking reaction zone maintained at high-severity temperatures and pressures. When the portion of the hydrocarbon feed stream 102 contacts the hot catalyst and is cracked to lighter products, carbonaceous deposits, commonly referred to as coke, form on the catalyst. The coke deposits formed on the catalyst may reduce the catalytic activity of the catalyst or deactivate the catalyst. Deactivation of the catalyst may result in the catalyst becoming catalytically ineffective. The spent catalyst having coke deposits may be separated from the cracking reaction products, stripped of removable hydrocarbons, and passed to a regeneration process where the coke is burned from the catalyst in the presence of air to produce a regenerated catalyst that is catalytically effective. The term "catalytically effective" refers to the ability of the regenerated catalyst to increase the rate of cracking reactions. The term "catalytic activity" refers to the degree to which the regenerated catalyst increases the rate of the cracking reactions and may be related to a number of catalytically active sites available on the catalyst. For example, coke deposits on the catalyst may cover up or block catalytically active sites on the spent catalyst, thus, reducing the number of catalytically active sites available, which may reduce the catalytic activity of the catalyst. Following regeneration, the regenerated catalyst may have equal to or less than 1 wt. % coke based on the total weight of the regenerated catalyst. The combustion products may be removed from the regeneration process as a flue gas stream. The heated regenerated catalysts may then be recycled back to the cracking reaction zone of the FCC units.

Referring now to FIG. 1, a HSFCC system 100 is schematically depicted. The HSFCC system 100 is a high-severity fluid catalytic cracking (HSFCC) system. The HSFCC system 100 generally receives a hydrocarbon feed stream 102 and directly processes the hydrocarbon feed stream 102 to produce one or more system product streams 110. The HSFCC system 100 may include a feed separator 104, a first FCC unit 120, a second FCC unit 140, and a regenerator 160.

Referring to FIG. 1, the hydrocarbon feed stream 102 may be introduced to the feed separator 104 which may separate the contents of the hydrocarbon feed stream 102 into a greater boiling point fraction stream 106 and a lesser boiling point fraction stream 108. In one or more embodiments, the feed separator 104 may be a vapor-liquid separator such as a flash drum (sometimes referred to as a breakpot, knock-out drum, knock-out pot, compressor suction drum, or compressor inlet drum). In embodiments that utilize a vapor-liquid separator as the feed separator 104, the lesser boiling point fraction stream 108 may exit the feed separator 104 as a vapor and the greater boiling point fraction stream 106 may exit the feed separator 104 as a liquid. The vapor-liquid separator may be operated at a temperature suitable to separate the hydrocarbon feed stream 102 into the greater boiling point fraction stream 106 and the lesser boiling point fraction stream 108. The temperature of the vapor-liquid separator may be from 180 degrees Celsius (° C.) to 400° C. For example, the contents of the lesser boiling point fraction stream 108 may have a boiling point of at least 180° C. and less than or equal to 400° C., less than or equal to 350° C., less than or equal to 300° C., less than or equal to 250° C., or less than or equal to 200° C. In some embodiments, the lesser boiling point fraction stream 108 may have a boiling point of less than 180° C. The contents of the greater boiling point fraction stream 106 may have a boiling point greater than the boiling point of the contents of the lesser boiling point fraction stream 108. The contents of the greater boiling point fraction stream 106 may have a boiling point greater than or equal to 200° C., greater than or equal to 250° C., greater than or equal to 300° C., greater than or equal to 350° C., or greater than or equal to 400° C.

In one or more embodiments, the feed separator 104 may be a flashing column that may separate the hydrocarbon feed stream 102 into the greater boiling point fraction stream 106 and the lesser boiling point fraction stream 108. The flashing column may be operated at a flashing temperature that results in the greater boiling point fraction stream 106 having less than 10 wt. % Conradson Carbon and less than 10 parts per million by weight (ppmw) total metals. In embodiments, the flashing column may be operated at a temperature of from 180° C. to 400° C. Alternatively, in other embodiments, the feed separator 104 may include at least one of a distillation device or a cyclonic vapor liquid separation device.

One or more supplemental feed streams (not shown) may be added to the hydrocarbon feed stream 102 prior to introducing the hydrocarbon feed stream 102 to the feed separator 104. As previously described, in one or more embodiments, the hydrocarbon feed stream 102 may be crude oil. In one or more embodiments, the hydrocarbon feed stream 102 may be crude oil, and one or more supplemental feed streams comprising one or more of a vacuum residue, tar sands, bitumen, atmospheric residue, vacuum gas oils, demetalized oils, naphtha streams, other hydrocarbon streams, or combinations of these materials, may be added to the crude oil upstream of the feed separator 104.

Although the present disclosure focuses on converting a hydrocarbon feed stream 102 that is a crude oil, the hydrocarbon feed stream 102 may alternatively comprise a plurality of refinery hydrocarbon streams outputted from one or more crude oil refinery operations. The plurality of refinery hydrocarbon streams may include a vacuum residue, an atmospheric residue, or a vacuum gas oil, for example. In some embodiments, the plurality of refinery hydrocarbon streams may be combined into the hydrocarbon feed stream 102. In these embodiments, the hydrocarbon feed stream 102 may be introduced to the feed separator 104 and separated into the greater boiling point fraction stream 106 and the lesser boiling point fraction stream 108. Alternatively, in some embodiments, the plurality of refinery hydrocarbon streams may be introduced directly to the first FCC unit 120, the second FCC unit 140, or both. For example, one or more heavy refinery hydrocarbon streams, such as vacuum residues, atmospheric residues, or vacuum gas oils, for example, may be introduced directly to the first FCC unit 120 as the greater boiling point fraction stream 106, and other light refinery hydrocarbon streams, such as a naphtha stream for example, may be introduced directly to the second FCC unit 140 as the lesser boiling point fraction stream 108.

Figure 2:
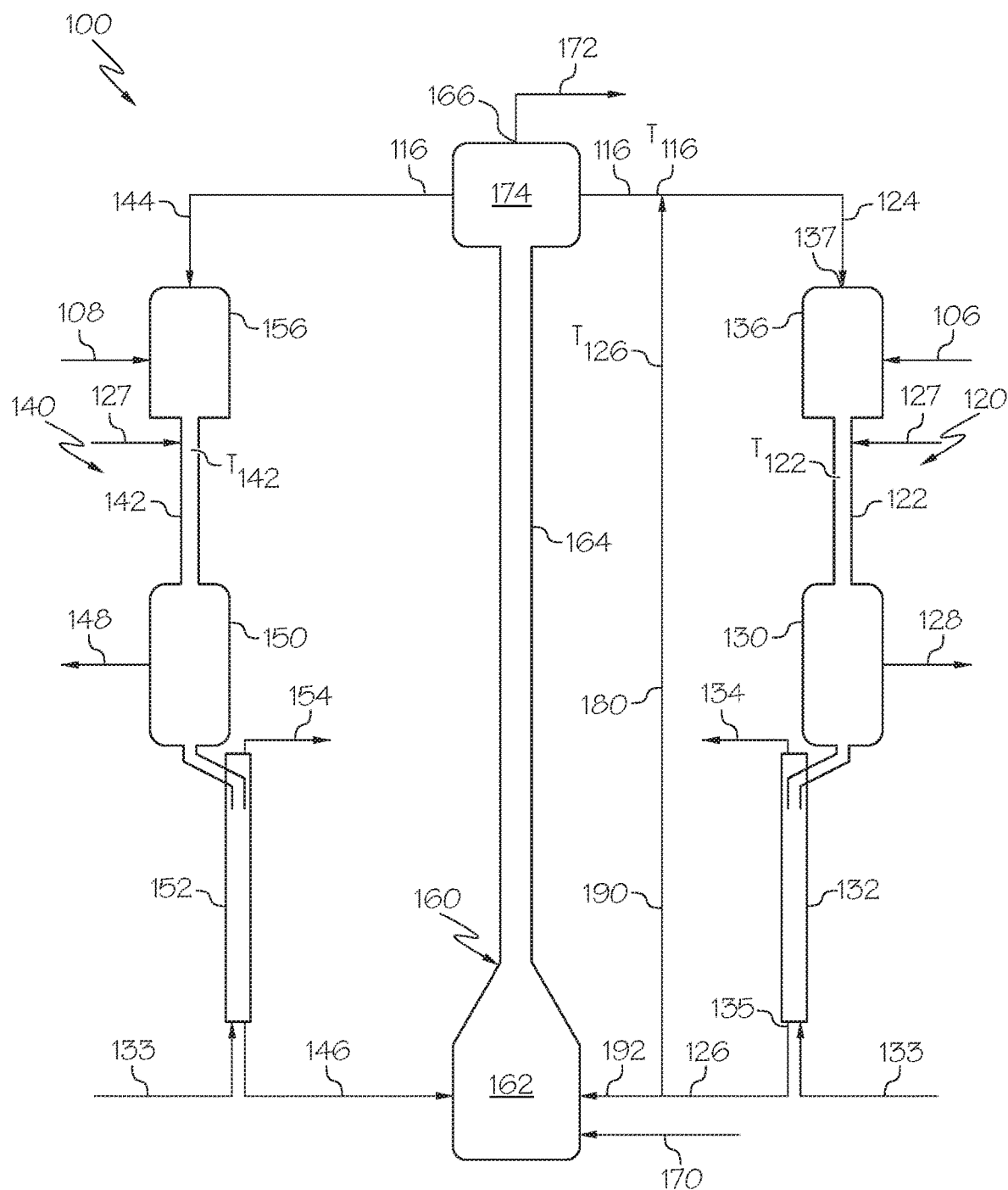
FIG. 2 depicts a schematic diagram of another embodiment of a HSFCC system, according to one or more embodiments described in this disclosure.

Referring to FIG. 2, the greater boiling point fraction stream 106 is passed to a first FCC unit 120 that includes a first cracking reaction zone 122. The greater boiling point fraction stream 106 is combined or mixed with a first catalyst 124 and cracked to produce a mixture of a spent first catalyst 126 and a first cracking reaction product stream 128. Steam 127 may be added to the first cracking reaction zone 122 to further increase the temperature in the first cracking reaction zone 122. The spent first catalyst 126 is separated from the first cracking reaction product 128 and passed to a regeneration zone 162 of the regenerator 160.

Still referring to FIG. 2, the lesser boiling point fraction stream 108 is passed to a second FCC unit 140 that includes a second cracking reaction zone 142. The lesser boiling point fraction stream 108 is mixed with a second catalyst 144 and cracked to produce a spent second catalyst 146 and a second cracking reaction product 148. Steam 127 may also be added to the second cracking reaction zone 142 to increase the temperature in the second cracking reaction zone 142. The spent second catalyst 146 is separated from the second cracking reaction product 148 and passed to the regeneration zone 162 of the regenerator 160. The spent first catalyst 126 and the spent second catalyst 146 may be combined and regenerated in the regeneration zone 162 of the regenerator 160 to produce a regenerated catalyst 116. The regenerated catalyst 116 may have a catalytic activity that is at least greater than the catalytic activity of the spent first catalyst 126 and the spent second catalyst 146. The regenerated catalyst 116 may then be passed back to the first cracking reaction zone 122 and the second cracking reaction zone 142. The first cracking reaction zone 122 and the second cracking reaction zone 142 may be operated in parallel.

Referring back to FIG. 1, in embodiments, the HSFCC system 100 may include at least one catalyst recycle, such as spent first catalyst recycle 180, spent second catalyst recycle 182, or both, for example. The catalyst recycles 180, 182 may be used to recycle the spent first catalyst 126, the spent second catalyst 146, or both to the first FCC unit 120, the second FCC unit 140, or both. The spent first catalyst 126, the spent second catalyst 146, or both may be combined with regenerated catalyst 116 to produce the first catalyst 124 to reduce the temperature, catalytic activity, or both of the first catalyst 124 relative to the regenerated catalyst 116. Similarly, the spent first catalyst 126, spent second catalyst 146, or both may be combined with the regenerated catalyst 116 to reduce the temperature, catalytic activity, or both of the second catalyst 144 relative to the regenerated catalyst 116. Recycling the spent first catalyst 126, the spent second catalyst 146, or both will be discussed in more detail subsequently in this disclosure.

The first cracking reaction product stream 128 and the second cracking reaction product stream 148 each may include a mixture of cracked hydrocarbon materials, which may be further separated into one or more greater value petrochemical products and recovered from the system in the one or more system product streams 110. For example, the first cracking reaction product stream 128, the second cracking reaction product stream 148, or both may include one or more of cracked gas oil, cracked gasoline, cracked naphtha, mixed butenes, butadiene, propene, ethylene, other olefins, ethane, methane, other petrochemical products, or combinations of these. The cracked gasoline may be further processed to obtain aromatics such as benzene, toluene, zylenes, or other aromatics for example. The HSFCC system 100 may include a product separator 112. The first cracking reaction product stream 128, the second cracking reaction product stream 148, or both the first and second cracking reaction product streams 128, 148 may be introduced to the product separator 112 to separate these streams into a plurality of system product streams 110, recycle streams 111, or both system product streams 110 and recycle streams 111. In some embodiments, the first cracking reaction product stream 128 and the second cracking reaction product stream 148 may be combined into a combined cracking reaction product stream 114. The combined cracking reaction product stream 114 may be introduced to the product separator 112. Referring to FIGS. 1 and 2, the product separator 112 may be fluidly coupled to the first separation zone 130 (FIG. 2), the second separation zone 150 (FIG. 2), or both the first separation zone 130 and the second separation zone 150. In embodiments, the first stripped product stream 134 (FIG. 2), the second stripped product stream 154 (FIG. 2), or both may be combined into the combined cracking reaction product stream 114.

Referring to FIG. 1, the product separator 112 may be a distillation column that separates the first cracking reaction product stream 128, the second cracking reaction product stream 148, or the combined cracking reaction product stream 114 into one or more system product streams 110, which may include one or more fuel oil streams, gasoline streams, mixed butenes stream, butadiene stream, propene stream, ethylene stream, ethane stream, methane stream, light cycle oil streams (LCO, 216-343° C.), heavy cycle oil streams (HCO, >343° C.), other product streams, or combinations of these. Each system product stream 110 may be passed to one or more additional unit operations for further processing. In embodiments, the first cracking reaction product stream 128 and the second cracking reaction product stream 148 may be separately introduced to the product separator 112. As used in this disclosure, the one or more system product streams 110 may be referred to as petrochemical products, which may be used as intermediates in downstream chemical processing or packaged as finished products. The product separator 112 may also produce one or more recycle streams 111, which may be recycled back to the first FCC unit 120, second FCC unit 140, or both the first FCC unit 120 and the second FCC unit 140.

Referring to FIG. 2, the first FCC unit 120 may include a first catalyst/feed mixing zone 136, the first cracking reaction zone 122, a first separation zone 130, and a first stripping zone 132. The greater boiling point fraction stream 106 may be introduced to the first catalyst/feed mixing zone 136, where the greater boiling point fraction stream 106 may be mixed with the first catalyst 124. During steady state operation of the HSFCC system 100, the first catalyst 124 may include at least the regenerated catalyst 116 that is passed to the first catalyst/feed mixing zone 136 from a catalyst hopper 174. In embodiments, the first catalyst 124 may be a mixture of spent first catalyst 126 and regenerated catalyst 116. Alternatively, the first catalyst 124 may be a mixture of spent second catalyst 146 and regenerated catalyst 116. The catalyst hopper 174 may receive the regenerated catalyst 116 from the regenerator 160. At initial start-up of the HSFCC system 100, the first catalyst 124 may include fresh catalyst (not shown), which is catalyst that has not been circulated through the first FCC unit 120 or the second FCC unit 140 and the regenerator 160. Because the fresh catalyst has not been circulated through a cracking reaction zone, the fresh catalyst may have a catalytic activity that is greater than the regenerated catalyst 116. In embodiments, fresh catalyst may also be introduced to the catalyst hopper 174 during operation of the HSFCC system 100 so that a portion of the first catalyst 124 introduced to the first catalyst/feed mixing zone 136 includes the fresh catalyst. Fresh catalyst may be introduced to the catalyst hopper 174 periodically during operation to replenish lost catalyst or compensate for spent catalyst that becomes deactivated, such as through heavy metal accumulation in the catalyst.

In some embodiments, one or more supplemental feed streams (not shown) may be combined with the greater boiling point fraction stream 106 before introduction of the greater boiling point fraction stream 106 to the first catalyst/feed mixing zone 136. In other embodiments, one or more supplemental feed streams may be added directly to the first catalyst/feed mixing zone 136, where the supplemental feed stream may be mixed with the greater boiling point fraction stream 106 and the first catalyst 124 prior to introduction into the first cracking reaction zone 122. As previously described, the supplemental feed stream may include one or more of vacuum residues, tar sands, bitumen, atmospheric residues, vacuum gas oils, demetalized oils, naphtha streams, other hydrocarbon streams, or combinations of these materials. Additionally, one or more recycle streams 111 (FIG. 1) from the product separator 112 (FIG. 1) may be combined with the greater boiling point fraction stream 106. For example, the recycle streams may include a cycle oil or slurry oil recovered from the product separator 112.

The mixture comprising the greater boiling point fraction stream 106 and the first catalyst 124 may be passed from the first catalyst/feed mixing zone 136 to the first cracking reaction zone 122. The mixture of the greater boiling point fraction stream 106 and first catalyst 124 may be introduced to a top portion of the first cracking reaction zone 122. The first cracking reaction zone 122 may be a downflow reactor or "downer" reactor in which the reactants flow from the first catalyst/feed mixing zone 136 vertically downward through the first cracking reaction zone 122 to the first separation zone 130. Steam 127 may be introduced to the top portion of the first cracking reaction zone 122 to provide additional heating to the mixture of the greater boiling point fraction stream 106 and the first catalyst 124. The greater boiling point fraction stream 106 may be reacted by contact with the first catalyst 124 in the first cracking reaction zone 122 to cause at least a portion of the greater boiling point fraction stream 106 to undergo at least a cracking reaction to form at least one cracking reaction product, which may include at least one of the petrochemical products previously described. The first catalyst 124 may have a temperature equal to or greater than the first cracking temperature $T_{122}$ of the first cracking reaction zone 122 and may transfer heat to the greater boiling point fraction stream 106 to promote the endothermic cracking reaction.

It should be understood that the first cracking reaction zone 122 of the first FCC unit 120 depicted in FIG. 2 is a simplified schematic of one particular embodiment of the first cracking reaction zone 122 of an FCC unit, and other configurations of the first cracking reaction zone 122 may be suitable for incorporation into the HSFCC system 100. For example, in some embodiments, the first cracking reaction zone 122 may be an up-flow cracking reaction zone. Other cracking reaction zone configurations are contemplated. The first FCC unit may be a HSFCC unit in which in the first cracking reaction zone 122, the fluidized first catalyst 124 contacts the greater boiling point fraction stream 106 under high-severity conditions. The first cracking temperature $T_{122}$ of the first cracking reaction zone 122 may be from 500° C. to 800° C., from 500° C. to 700° C., from 500° C. to 650° C., from 500° C. to 600° C., from 550° C. to 800° C., from 550° C. to 700° C., from 550° C. to 650° C., from 550° C. to 600° C., from 600° C. to 800° C., from 600° C. to 700° C., or from 600° C. to 650° C. In one or more embodiments, the first cracking temperature $T_{122}$ of the first cracking reaction zone 122 may be from 500° C. to 700° C. In one or more embodiments, the first cracking temperature $T_{122}$ of the first cracking reaction zone 122 may be from 550° C. to 630° C.

A weight ratio of the first catalyst 124 to the greater boiling point fraction stream 106 in the first cracking reaction zone 122 (the catalyst to hydrocarbon ratio) may be from 5:1 to 40:1, from 5:1 to 35:1, from 5:1 to 30:1, from 5:1 to 25:1, from 5:1 to 15:1, from 5:1 to 10:1, from 10:1 to 40:1, from 10:1 to 35:1, from 10:1 to 30:1, from 10:1 to 25:1, from 10:1 to 15:1, from 15:1 to 40:1, from 15:1 to 35:1, from 15:1 to 30:1, from 15:1 to 25:1, from 25:1 to 40:1, from 25:1 to 35:1, from 25:1 to 30:1, or from 30:1 to 40:1. The residence time of the mixture of first catalyst 124 and the greater boiling point fraction stream 106 in the first cracking reaction zone 122 may be from 0.2 seconds (sec) to 3 sec, from 0.2 sec to 2.5 sec, from 0.2 sec to 2 sec, from 0.2 sec to 1.5 sec, from 0.4 sec to 3 sec, from 0.4 sec to 2.5 sec, or from 0.4 sec to 2 sec, from 0.4 sec to 1.5 sec, from 1.5 sec to 3 sec, from 1.5 sec to 2.5 sec, from 1.5 sec to 2 sec, or from 2 sec to 3 sec.

Following the cracking reaction in the first cracking reaction zone 122, the contents of the effluent from the first cracking reaction zone 122 may include the first catalyst 124 and the first cracking reaction product stream 128, which may then be passed to the first separation zone 130. In the first separation zone 130, the first catalyst 124 may be separated from at least a portion of the first cracking reaction product stream 128. In some embodiments, the first separation zone 130 may include one or more gas-solid separators, such as one or more cyclones. The first catalyst 124 exiting from the first separation zone 130 may retain at least a residual portion of the first cracking reaction product stream 128.

After the first separation zone 130, the first catalyst 124, which may include the residual portion of the first cracking reaction product 128 retained in the first catalyst 124, may be passed to a first stripping zone 132, where at least some of the residual portion of the first cracking reaction product stream 128 may be stripped from the first catalyst 124 and recovered as a first stripped product stream 134. The first stripped product stream 134 may be passed to one or more than one downstream unit operations or combined with one or more than one other streams for further processing. Steam 133 may be introduced to the first stripping zone 132 to facilitate stripping the first cracking reaction product 128 from the first catalyst 124. The first stripped product stream 134 may include at least a portion of the steam 133 introduced to the first stripping zone 132. The first stripped product stream 134 may be discharged from the first stripping zone 132 and may be passed through cyclone separators (not shown) and out of the stripper vessel (not shown). The first stripped product stream 134 may be directed to one or more product recovery systems in accordance with known methods in the art. The first stripped product stream 134 may also be combined with one or more other streams, such as the first cracking reaction product stream 128, for example.

The spent first catalyst 126, which is the first catalyst 124 after stripping out the first stripped product stream 134, may be passed from the first stripping zone 132 to the regeneration zone 162 of the regenerator 160 to be regenerated to produce regenerated catalyst 116.

Referring to FIG. 2, the lesser boiling point fraction stream 108 may be passed from the feed separator 104 (FIG. 1) to the second FCC unit 140. The second FCC unit 140 may include a second catalyst/feed mixing zone 156, the second cracking reaction zone 142, a second separation zone 150, and a second stripping zone 152. The lesser boiling point fraction stream 108 may be introduced to the second catalyst/feed mixing zone 156, where the lesser boiling point fraction stream 108 may be mixed with the second catalyst 144. During steady state operation of the HSFCC system 100, the second catalyst 144 may include at least the regenerated catalyst 116 that is passed to the second catalyst/feed mixing zone 156 from a catalyst hopper 174. In embodiments, the second catalyst 144 may be a mixture of spent second catalyst 146 and regenerated catalyst 116. Alternatively, the second catalyst 144 may be a mixture of spent first catalyst 126 and regenerated catalyst 116. The catalyst hopper 174 may receive the regenerated catalyst 116 from the regenerator 160 following regeneration of the spent first catalyst 126 and spent second catalyst 146. At initial start-up of the HSFCC system 100, the second catalyst 144 may include fresh catalyst (not shown), which is catalyst that has not been circulated through the first FCC unit 120 or the second FCC unit 140 and the regenerator 160. In embodiments, fresh catalyst may also be introduced to catalyst hopper 174 during operation of the HSFCC system 100 so that at least a portion of the second catalyst 144 introduced to the second catalyst/feed mixing zone 156 includes the fresh catalyst. Fresh catalyst may be introduced to the catalyst hopper 174 periodically during operation to replenish lost catalyst or compensate for spent catalyst that becomes permanently deactivated, such as through heavy metal accumulation in the catalyst.

In some embodiments, one or more supplemental feed streams (not shown) may be combined with the lesser boiling point fraction stream 108 before introduction of the lesser boiling point fraction stream 108 to the second catalyst/feed mixing zone 156. In other embodiments, one or more supplemental feed streams may be added directly to the second catalyst/feed mixing zone 156, where the supplemental feed stream may be mixed with the lesser boiling point fraction stream 108 and the second catalyst 144 prior to introduction into the second cracking reaction zone 142. The supplemental feed stream may include one or more naphtha streams or other lesser boiling hydrocarbon streams. Additionally, one or more than one recycle stream 111 (FIG. 1) from the product separator 112 (FIG. 1) may be combined with the lesser boiling point fraction stream 108.

The mixture comprising the lesser boiling point fraction stream 108 and the second catalyst 144 may be passed from the second catalyst/feed mixing zone 156 to the second cracking reaction zone 142. The mixture of the lesser boiling point fraction stream 108 and second catalyst 144 may be introduced to a top portion of the second cracking reaction zone 142. The second cracking reaction zone 142 may be a downflow reactor or "downer" reactor in which the reactants flow from the second catalyst/feed mixing zone 156 downward through the second cracking reaction zone 142 to the second separation zone 150. Steam 127 may be introduced to the top portion of the second cracking reaction zone 142 to provide additional heating to the mixture of the lesser boiling point fraction stream 108 and the second catalyst 144. The lesser boiling point fraction stream 108 may be reacted by contact with the second catalyst 144 in the second cracking reaction zone 142 to cause at least a portion of the lesser boiling point fraction stream 108 to undergo at least one cracking reaction to form at least one cracking reaction product, which may include at least one of the petrochemical products previously described. The second catalyst 144 may have a temperature equal to or greater than the second cracking temperature $T_{142}$ of the second cracking reaction zone 142 and may transfer heat to the lesser boiling point fraction stream 108 to promote the endothermic cracking reaction.

It should be understood that the second cracking reaction zone 142 of the second FCC unit 140 depicted in FIG. 2 is a simplified schematic of one particular embodiment of the second cracking reaction zone 142, and other configurations of the second cracking reaction zone 142 may be suitable for incorporation into the HSFCC system 100. For example, in some embodiments, the second cracking reaction zone 142 may be an up-flow cracking reaction zone. Other cracking reaction zone configurations are contemplated. The second FCC unit may be a HSFCC unit in which in the second cracking reaction zone 142, the fluidized second catalyst 144 contacts the lesser boiling point fraction stream 108 at high-severity conditions. The second cracking temperature $T_{142}$ of the second cracking reaction zone 142 may be from 500° C. to 800° C., from 500° C. to 700° C., from 500° C. to 650° C., from 500° C. to 600° C., from 550° C. to 800° C., from 550° C. to 700° C., from 550° C. to 650° C., from 550° C. to 600° C., from 600° C. to 800° C., from 600° C. to 700° C., or from 600° C. to 650° C. In some embodiments, the second cracking temperature $T_{142}$ of the second cracking reaction zone 142 may be from 500° C. to 700° C. In other embodiments, the second cracking temperature $T_{142}$ of the second cracking reaction zone 142 may be from 550° C. to 630° C. In some embodiments, the second cracking temperature $T_{142}$ may be different than the first cracking temperature $T_{122}$.

A weight ratio of the second catalyst 144 to the lesser boiling point fraction stream 108 in the second cracking reaction zone 142 (catalyst to hydrocarbon ratio) may be from 5:1 to 40:1, from 5:1 to 35:1, from 5:1 to 30:1, from 5:1 to 25:1, from 5:1 to 15:1, from 5:1 to 10:1, from 10:1 to 40:1, from 10:1 to 35:1, from 10:1 to 30:1, from 10:1 to 25:1, from 10:1 to 15:1, from 15:1 to 40:1, from 15:1 to 35:1, from 15:1 to 30:1, from 15:1 to 25:1, from 25:1 to 40:1, from 25:1 to 35:1, from 25:1 to 30:1, or from 30:1 to 40:1. In some embodiments, the weight ratio of the second catalyst 144 to the lesser boiling point fraction stream 108 in the second cracking reaction zone 142 may be different than the weight ratio of the first catalyst 124 to the greater boiling point fraction stream 106 in the first cracking reaction zone 122. The residence time of the mixture of second catalyst 144 and the lesser boiling point fraction stream 108 in the second cracking reaction zone 142 may be from 0.2 seconds (sec) to 3 sec, from 0.2 sec to 2.5 sec, from 0.2 sec to 2 sec, from 0.2 sec to 1.5 sec, from 0.4 sec to 3 sec, from 0.4 sec to 2.5 sec, or from 0.4 sec to 2 sec, from 0.4 sec to 1.5 sec, from 1.5 sec to 3 sec, from 1.5 sec to 2.5 sec, from 1.5 sec to 2 sec, or from 2 sec to 3 sec. In some embodiments, the residence time in the second cracking reaction zone 142 may be different than the residence time in the first cracking reaction zone 122.

Following the cracking reaction in the second cracking reaction zone 142, the contents of effluent from the second cracking reaction zone 142 may include the second catalyst 144 and the second cracking reaction product stream 148, which may be passed to the second separation zone 150. In the second separation zone 150, the second catalyst 144 may be separated from at least a portion of the second cracking reaction product stream 148. In embodiments, the second separation zone 150 may include one or more gas-solid separators, such as one or more cyclones. The second catalyst 144 exiting from the second separation zone 150 may retain at least a residual portion of the second cracking reaction product stream 148.

After the second separation zone 150, the second catalyst 144 may be passed to the second stripping zone 152, where at least some of the residual portion of the second cracking reaction product stream 148 may be stripped from the second catalyst 144 and recovered as a second stripped product stream 154. The second stripped product stream 154 may be passed to one or more than one downstream unit operations or combined with one or more than one other streams for further processing. Steam 133 may be introduced to the second stripping zone 152 to facilitate stripping the second cracking reaction product 148 from the second catalyst 144. The second stripped product stream 154 may include at least a portion of the steam 133 introduced to the second stripping zone 152 and may be passed out of the second stripping zone 152. The second stripped product stream 154 may pass through cyclone separators (not shown) and out of the stripper vessel (not shown). The second stripped product stream 154 may be directed to one or more product recovery systems in accordance with known methods in the art. The second stripped product stream 154 may also be combined with one or more other streams, such as the second cracking reaction product stream 148. Combination with other streams is contemplated. The spent second catalyst 146, which is the second catalyst 144 after stripping out the second stripped product stream 154, may be passed from the second stripping zone 152 to the regeneration zone 162 of the regenerator 160.

Referring to FIG. 2, the same type of catalyst may be used throughout the HSFCC system 100, such as for the first catalyst 124 and the second catalyst 144. The catalyst (first catalyst 124 and second catalyst 144) used in the HSFCC system 100 may include one or more fluid catalytic cracking catalysts that are suitable for use in the first cracking reaction zone 122 and the second cracking reaction zone 142. The catalyst may be a heat carrier and may provide heat transfer to the greater boiling point fraction stream 106 in the first cracking reaction zone 122 operated at high-severity conditions and the lesser boiling point fraction 108 in the second cracking reaction zone 142 operated at high-severity conditions. The catalyst may also have a plurality of catalytically active sites, such as acidic sites for example, that promote the cracking reaction. For example, in embodiments, the catalyst may be a high-activity FCC catalyst having high catalytic activity. Examples of fluid catalytic cracking catalysts suitable for use in the HSFCC system 100 may include, without limitation, zeolites, silica-alumina catalysts, carbon monoxide burning promoter additives, bottoms cracking additives, light olefin-producing additives, other catalyst additives, or combinations of these components. Zeolites that may be used as at least a portion of the catalyst for cracking may include, but are not limited to Y, REY, USY, RE-USY zeolites, or combinations of these. The catalyst may also include a shaped selective catalyst additive, such as ZSM-5 zeolite crystals or other pentasil-type catalyst structures, which are often used in other FCC processes to produce light olefins and/or increase FCC gasoline octane. In one or more embodiments, the catalyst may include a mixture of a ZSM-5 zeolite crystals and the cracking catalyst zeolite and matrix structure of a typical FCC cracking catalyst. In one or more embodiments, the catalyst may be a mixture of Y and ZSM-5 zeolite catalysts embedded with clay, alumina, and binder.

In one or more embodiments, at least a portion of the catalyst may be modified to include one or more rare earth elements (15 elements of the Lanthanide series of the IUPAC Periodic Table plus scandium and yttrium), alkaline earth metals (Group 2 of the IUPAC Periodic Table), transition metals, phosphorus, fluorine, or any combination of these, which may enhance olefin yield in the first cracking reaction zone 122, second cracking reaction zone 142, or both. Transition metals may include "an element whose atom has a partially filled d sub-shell, or which can give rise to cations with an incomplete d sub-shell" [IUPAC, Compendium of Chemical Terminology, 2nd ed. (the "Gold Book") (1997). Online corrected version: (2006) "transition element". One or more transition metals or metal oxides may also be impregnated onto the catalyst. Metals or metal oxides may include one or more metals from Groups 6-10 of the IUPAC Periodic Table. In some embodiments, the metals or metal oxides may include one or more of molybdenum, rhenium, tungsten, or any combination of these. In one or more embodiments, a portion of the catalyst may be impregnated with tungsten oxide.

Referring to FIG. 2, the first FCC unit 120 and the second FCC unit 140 share the regenerator 160. The spent first catalyst 126 and the spent second catalyst 146 may be passed to the regenerator 160, where the spent first catalyst 126 and the spent second catalyst 146 are mixed together and regenerated to produce the regenerated catalyst 116. The regenerator 160 may include the regeneration zone 162, a catalyst transfer line 164, the catalyst hopper 174, and a flue gas vent 166. The catalyst transfer line 164 is fluidly coupled to the regeneration zone 162 and the catalyst hopper 174 for passing the regenerated catalyst 116 from the regeneration zone 162 to the catalyst hopper 174. In some embodiments, the regenerator 160 may have more than one catalyst hopper 174, such as a first catalyst hopper (not shown) for the first FCC unit 120 and a second catalyst hopper (not shown) for the second FCC unit 140, for example. In some embodiments, the flue gas vent 166 may be positioned at the catalyst hopper 174.

In operation, the spent first catalyst 126 and spent second catalyst 146 may be passed from the first stripping zone 132 and the second stripping zone 152, respectively, to the regeneration zone 162. Combustion gas 170 may be introduced to the regeneration zone 162. The combustion gases 170 may include one or more of combustion air, oxygen, fuel gas, fuel oil, other component, or any combinations of these. In the regeneration zone 162, the coke deposited on the spent first catalyst 126 and the spent second catalyst 146 may at least partially oxidize (combusts) in the presence of the combustion gases 170 to form at least carbon dioxide and water. In some embodiments, the coke deposits on the spent first catalyst 126 and spent second catalyst 146 may be fully oxidized in the regeneration zone 162. Other organic compounds, such as residual first cracking reaction product or second cracking reaction product for example, may also oxidize in the presence of the combustion gases 170 in the regeneration zone. Other gases, such as carbon monoxide for example, may be formed during coke oxidation in the regeneration zone 162. Oxidation of the coke deposits produces heat, which may be transferred to and retained by the regenerated catalyst 116.

The single catalyst regenerator 160 for regenerating the spent first catalyst 126 and the spent second catalyst 146 may improve the overall efficiency of the HSFCC system 100. For example, cracking of the lesser boiling point fraction 108 in the second FCC unit 140 may produce less coke deposits on the spent second catalyst 146 compared to cracking of the greater boiling point fraction 106 in the first FCC unit. Combustion of the coke deposits on the spent second catalyst 146 during regeneration produces heat, but the amount of coke present on the spent second catalyst 146 may not be sufficient to produce enough heat to conduct the cracking reactions in the second cracking reaction zone 142. Thus, regeneration of the spent second catalyst 146 by itself may not produce enough heat to raise the temperature of the regenerated catalyst 116 to an acceptable second cracking temperature $T_{142}$ in the second cracking reaction zone 142. By comparison, the amount of coke formed and deposited on the spent first catalyst 126 during cracking of the greater boiling point fraction stream 106 in the first FCC unit 120 may be substantially greater than the coke deposits produced in the second cracking reaction zone 142. Combustion of the coke deposits on the spent first catalyst 126 during catalyst regeneration may produce sufficient heat to raise the temperature of the regenerated catalyst 116 (including regenerated catalyst 116 produced from both the spent first catalyst 126 and the spent second catalyst 146) to high-severity conditions, such as a regenerated catalyst temperature $T_{116}$ equal to or greater than the first cracking temperature $T_{122}$ or the second cracking temperature $T_{142}$ for example, and may provide the heat required to conduct the cracking reactions in both the first cracking reaction zone 122 and the second cracking reaction zone 142.

The flue gases 172 may convey the regenerated catalyst 116 through the catalyst transfer line 164 from the regeneration zone 162 to the catalyst hopper 174. The regenerated catalyst 116 may accumulate in the catalyst hopper 174 prior to passing from the catalyst hopper 174 to the first FCC unit 120 and the second FCC unit 140. The catalyst hopper 174 may act as a gas-solid separator to separate the flue gas 172 from the regenerated catalyst 116. In embodiments, the flue gas 172 may pass out of the catalyst hopper 174 through a flue gas vent 166 disposed in the catalyst hopper 174.

The catalyst may be circulated through the first and second FCC units 120, 140, the regenerator 160, and the catalyst hopper 174. For example, the first catalyst 124 may be introduced to the first FCC unit 120 to catalytically crack the greater boiling point fraction 106 in the first FCC unit 120. During cracking, coke deposits may form on the first catalyst 124 to produce the spent first catalyst 126 passing out of the first stripping zone 132. The spent first catalyst 126 may have catalytic activity that is less than the regenerated catalyst 116, meaning that the spent first catalyst 126 may be less effective at enabling cracking reactions compared to the regenerated catalyst 116. The spent first catalyst 126 may be separated from the first cracking reaction product stream 128 in the first separation zone 130 and the first stripping zone 132. The second catalyst 144 may be introduced to the second FCC unit 140 to catalytically crack the lesser boiling point fraction 108 in the second FCC unit 140. During cracking, coke deposits may form on the second catalyst 144 to produce the spent second catalyst 146 passing out of the second stripping zone 152. The spent second catalyst 146 also may have a catalytic activity that is less than the catalytic activity of the regenerated catalyst 116, meaning that the spent second catalyst 146 may be less effective at enabling the cracking reactions compared to the regenerated catalyst 116. The spent second catalyst 146 may be separated from the second cracking reaction product stream 148 in the second separation zone 150 and the second stripping zone 152. The spent first catalyst 126 and spent second catalyst 146 may then be combined and regenerated in the regeneration zone 162 to produce the regenerated catalyst 116. The regenerated catalyst 116 may be transferred to the catalyst hopper 174.

The regenerated catalyst 116 passing out of the regeneration zone 162 may have less than 1 wt. % coke deposits, based on the total weight of the regenerated catalyst 116. In some embodiments, the regenerated catalyst 116 passing out of the regeneration zone 162 may have less than 0.5 wt. %, less than 0.1 wt. %, or less than 0.05 wt. % coke deposits. In some embodiments, the regenerated catalyst 116 passing out of the regeneration zone 162 to the catalyst hopper 174 may have from 0.001 wt. % to 1 wt. %, from 0.001 wt. % to 0.5 wt. %, from 0.001 wt. % to 0.1 wt. %, from 0.001 wt. % to 0.05 wt. %, from 0.005 wt. % to 1 wt. %, from 0.005 wt. % to 0.5 wt. %, from 0.005 wt. % to 0.1 wt. %, from 0.005 wt. % to 0.05 wt. %, from 0.01 wt. % to 1 wt. %, from 0.01 wt. % to 0.5 wt. % to 0.01 wt. % to 0.1 wt. %, from 0.01 wt. % to 0.05 wt. % coke deposits, based on the total weight of the regenerated catalyst 116. In one or more embodiments, the regenerated catalyst 116 passing out of regeneration zone 162 may be substantially free of coke deposits. As used in this disclosure, the term "substantially free" of a component means less than 1 wt. % of that component in a particular portion of a catalyst, stream, or reaction zone. As an example, the regenerated catalyst 116 that is substantially free of coke deposits may have less than 1 wt. % of coke deposits. Removal of the coke deposits from the regenerated catalyst 116 in the regeneration zone 162 may remove the coke deposits from the catalytically active sites, such as acidic sites for example, of the catalyst that promote the cracking reaction. Removal of the coke deposits from the catalytically active sites on the catalyst may increase the catalytic activity of the regenerated catalyst 116 compared to the spent first catalyst 126 and spent second catalyst 146. Thus, the regenerated catalyst 116 may have a catalytic activity that is greater than the spent first catalyst 126 and the spent second catalyst 146.

The regenerated catalyst 116 may absorb at least a portion of the heat generated from combustion of the coke deposits. The heat may increase the temperature of the regenerated catalyst 116 compared to the temperature of the spent first catalyst 126 and spent second catalyst 146. The regenerated catalyst 116 may accumulate in the catalyst hopper 174 until it is passed back to the first FCC unit 120 as at least a portion of the first catalyst 124 and the second FCC unit 140 as at least a portion of the second catalyst 144. The regenerated catalyst 116 in the catalyst hopper 174 may have a temperature that is equal to or greater than the first cracking temperature $T_{122}$ in the first cracking reaction zone 122 of the first FCC unit 120, the second cracking temperature $T_{142}$ in the second cracking reaction zone 142 of the second FCC unit 140, or both. The greater temperature of the regenerated catalyst 116 may provide heat for the endothermic cracking reaction in the first cracking reaction zone 122, the second cracking reaction zone 142, or both.

As previously discussed, hydrocarbon feed streams 102, such as crude oil for example, can have a wide range of compositions and a wide range of boiling points. The hydrocarbon feed stream 102 may be separated into the greater boiling point fraction 106 and the lesser boiling point fraction 108. The greater boiling point fraction 106 generally has a different composition than the lesser boiling point fraction 108. Thus, each of the greater boiling point fraction 106 and the lesser boiling point fraction 108 may require different operating temperatures and catalyst activities to produce desired yields of one or more petrochemical products or increase the selectivity of the reaction for certain products. For example, the greater boiling point fraction 106 may be more reactive and, thus, may require less cracking activity than the lesser boiling point fraction 108 to produce sufficient yields of or selectivity for a specific petrochemical product. The lesser cracking activity suitable for the greater boiling point fraction 106 may be provided by reducing the catalytic activity of the first catalyst 124 in the first cracking reaction zone 122, reducing the first cracking temperature $T_{122}$ in the first cracking reaction zone 122, or a combination of both. In contrast, the lesser boiling point fraction 108 may be less reactive and may require greater catalytic activity, such as an increased catalytic activity of the second catalyst 144 in the second cracking reaction zone 142, a second cracking temperature $T_{142}$ in the second cracking reaction zone 142 greater than the first cracking temperature $T_{122}$, or both, compared to the greater boiling point fraction 106 to produce sufficient yields of or selectivity for the specific petrochemical products.

As previously described in this disclosure, the HSFCC system 100 may include a single regenerator 160 to regenerate the spent first catalyst 126 and the spent second catalyst 146 to produce the regenerated catalyst 116. Therefore, the regenerated catalyst 116 passed to the first FCC unit 120 is the same as and has the same catalytic effectiveness and temperature as the regenerated catalyst 116 passed to the second FCC unit 140. However, as previously discussed, the reaction conditions in the first FCC unit 120 or second FCC unit 140 for producing sufficient yields of or selectivity for specific petrochemical products may be different than the reaction conditions provided by passing the regenerated catalyst 116 to the other of the first FCC unit 120 or the second FCC unit 140.

Referring to FIGS. 2-5, in embodiments described in this disclosure, a portion of the spent first catalyst 126, a portion of the spent second catalyst 146, or both may be recycled to the first FCC unit 120, the second FCC unit 140, or both. The recycle portion 190 (FIG. 2) of the spent first catalyst 126, the recycle portion 194 (FIG. 3) of the spent second catalyst 146, or both may bypass the regenerator 160 so that the recycle portion 190 of the spent first catalyst 126, the recycle portion 194 of the spent second catalyst 146, or both may be introduced back into the first FCC unit 120, the second FCC unit 140, or both without being regenerated. A spent first catalyst temperature $T_{126}$ of the recycle portion 190 of the spent first catalyst 126, the spent second catalyst temperature $T_{146}$ of the recycle portion 194 of the spent second catalyst 146, or both may be less than the regenerated catalyst temperature $T_{116}$. Additionally, the recycle portion 190 of the spent first catalyst 126, the recycle portion 194 of the spent second catalyst 146, or both may have reduced catalytic effectiveness compared to the regenerated catalyst 116.

Recycling a portion of the spent first catalyst 126 or spent second catalyst 146 back to the first FCC unit 120, the second FCC unit 140, or both may reduce the first cracking temperature $T_{122}$ in the first cracking reaction zone 122 or the second cracking temperature $T_{142}$ in the second cracking reaction zone, or both. Recycling a portion of the spent first catalyst 126 or the spent second catalyst 146 back to the first FCC unit 120, the second FCC unit 140, or both may also reduce the average catalytic activity of the first catalyst 124 in the first cracking reaction zone 122, the second catalyst 144 in the second cracking reaction zone 142, or both.

Referring to FIG. 2, the HSFCC system 100 may include a spent first catalyst recycle 180. The spent first catalyst recycle 180 may fluidly couple an outlet 135 of the first stripping zone 132 to an inlet 137 of the first catalyst/feed mixing zone 136. The spent first catalyst recycle 180 may pass the recycle portion 190 of the spent first catalyst 126 from the outlet 135 of the first stripping zone 132 to the inlet 137 of the first catalyst/feed mixing zone 136. The recycle portion 190 of the spent first catalyst 126 may be combined with regenerated catalyst 116 from the catalyst hopper 174 upstream of the first cracking reaction zone 122 such that the first catalyst 124 introduced to the first cracking reaction zone 122 comprises a mixture of the regenerated catalyst 116 and the recycle portion 190 of the spent first catalyst 126. In some embodiments, the recycle portion 190 of the spent first catalyst 126 may be introduced to the first catalyst/feed mixing zone 136 where the recycle portion 190 of the spent first catalyst 126 is mixed with the regenerated catalyst 116 and the greater boiling point fraction stream 106 before passing the first catalyst 124 (mixture of the spent first catalyst 126 and regenerated catalyst 116) and the greater boiling point fraction stream 106 to the first cracking reaction zone 122. In other embodiments, the recycle portion 190 of the spent first catalyst 126 may be combined with the regenerated catalyst 116 upstream of the first catalyst/feed mixing zone 136. A non-recycle portion 192 of the spent first catalyst 126 may be passed to the regenerator 160 for regeneration.

The recycle portion 190 of the spent first catalyst 126 may have a spent first catalyst temperature $T_{126}$ that is less than a regenerated catalyst temperature $T_{116}$ of the regenerated catalyst 116. Mixing of the recycle portion 190 of the spent first catalyst 126 with the regenerated catalyst 116 may reduce the average temperature of the first catalyst 124 introduced to the first cracking reaction zone 122. Reducing the average temperature of the first catalyst 124 may reduce the first cracking temperature $T_{22}$ in the first cracking reaction zone 122.

Additionally, mixing the recycle portion 190 of the spent first catalyst 126 with the regenerated catalyst 116 may reduce the average catalytic activity of the first catalyst 124 introduced to the first cracking reaction zone 122. As previously discussed, during the cracking reaction in the first cracking reaction zone 122, coke deposits may form on the spent first catalyst 126. The coke deposits may block catalytically active sites on the spent first catalyst 126 reducing the catalytic activity of the spent first catalyst 126. The spent first catalyst 126 may have lesser catalytic activity compared to the regenerated catalyst 116. Therefore, mixing the recycle portion 190 of the spent first catalyst 126 with the regenerated catalyst 116 to produce the first catalyst 124 may reduce the average catalytic activity of the first catalyst 124 introduced to the first cracking reaction zone 122 compared to the catalytic activity of the regenerated catalyst 116.

In embodiments, the first catalyst 124 introduced to the first cracking reaction zone 122 may have a weight ratio of the spent first catalyst 126 to the regenerated catalyst 116 sufficient to reduce the first cracking temperature $T_{122}$ in the first cracking reaction zone 122 compared to the regenerated catalyst temperature $T_{116}$. In other embodiments, the first catalyst 124 introduced to the first cracking reaction zone 122 may have a weight ratio of the spent first catalyst 126 to the regenerated catalyst 116 sufficient to reduce the average catalytic activity of the first catalyst 124 introduced to the first cracking reaction zone 122 compared to the catalytic activity of the regenerated catalyst 116. The first catalyst 124 may have a weight ratio of the spent first catalyst 126 to the regenerated catalyst 116 sufficient to increase the yield of a petrochemical product in the first cracking reaction product stream 128 compared to the yield of the same petrochemical product attainable by feeding the regenerated catalyst 116 to the first cracking reaction zone 122 without the spent first catalyst 126. In embodiments, the first catalyst 124 introduced to the first cracking reaction zone 122 may have a weight ratio of the spent first catalyst 126 to the regenerated catalyst 116 of from 1:99 to 99:1, from 1:99 to 90:10, from 1:99 to 75:25, from 1:99 to 50:50, from 1:99 to 25:75, from 1:99 to 10:90, from 10:90 to 99:1, from 10:90 to 90:10, from 10:90 to 75:25, from 10:90 to 50:50, from 10:90 to 25:75, from 25:75 to 99:1, from 25:75 to 90:10, from 25:75 to 75:25, from 25:75 to 50:50, from 50:50 to 99:1, from 50:50 to 90:10, from 50:50 to 75:25, from 75:25 to 99:1, from 75:25 to 90:10, or from 90:10 to 99:1.

In embodiments, the weight ratio of the spent first catalyst 126 to the regenerated catalyst 116 in the first catalyst 124 introduced to the first cracking reaction zone 122 may be controlled to modify the reaction conditions in the first cracking reaction zone 122. For example, controlling the weight ratio of the spent first catalyst 126 to the regenerated catalyst 116 in the first catalyst 124 introduced to the first cracking reaction zone 122 may control the first cracking temperature $T_{122}$, an average catalyst activity, or both in the first cracking reaction zone 122, which may enable improving the yield of one or more petrochemical products in the first cracking reaction product stream 128. The weight ratio of the spent first catalyst 126 to the regenerated catalyst 116 may be controlled by controlling the flow rate of the recycle portion 190 of the spent first catalyst 126 through the spent first catalyst recycle 180, the flow rate of regenerated catalyst 116 from the catalyst hopper 174, or both. In embodiments, increasing the weight ratio of the spent first catalyst 126 to the regenerated catalyst 116 in the first catalyst 124 introduced to the first cracking reaction zone 122 may increase the yield of olefins, such as butene, propene, and other olefins for example, and may decrease the yield of gasolines. Alternatively, in other embodiments, decreasing the weight ratio of the spent first catalyst 126 to the regenerated catalyst 116 in the first catalyst 124 introduced to the first cracking reaction zone 122 may increase the yield of gasolines, and decrease the yield of olefins, such as butene, propene, and other olefins for example.

The weight ratio of the spent first catalyst 126 to the regenerated catalyst 116 in the first catalyst 124 introduced to the first cracking reaction zone 122 or the recycle rate of the spent first catalyst 126 may be controlled in response to the catalyst to hydrocarbon weight ratio in the first cracking reaction zone 122. Alternatively, the weight ratio of the spent first catalyst 126 to the regenerated catalyst 116 in the first catalyst 124 introduced to the first cracking reaction zone 122 or the recycle rate of the spent first catalyst 126 may be controlled in response to the product selectivity of the first cracking reaction zone 122, which may be determined by measuring the composition of the first cracking reaction product stream 128.

Figure 3:
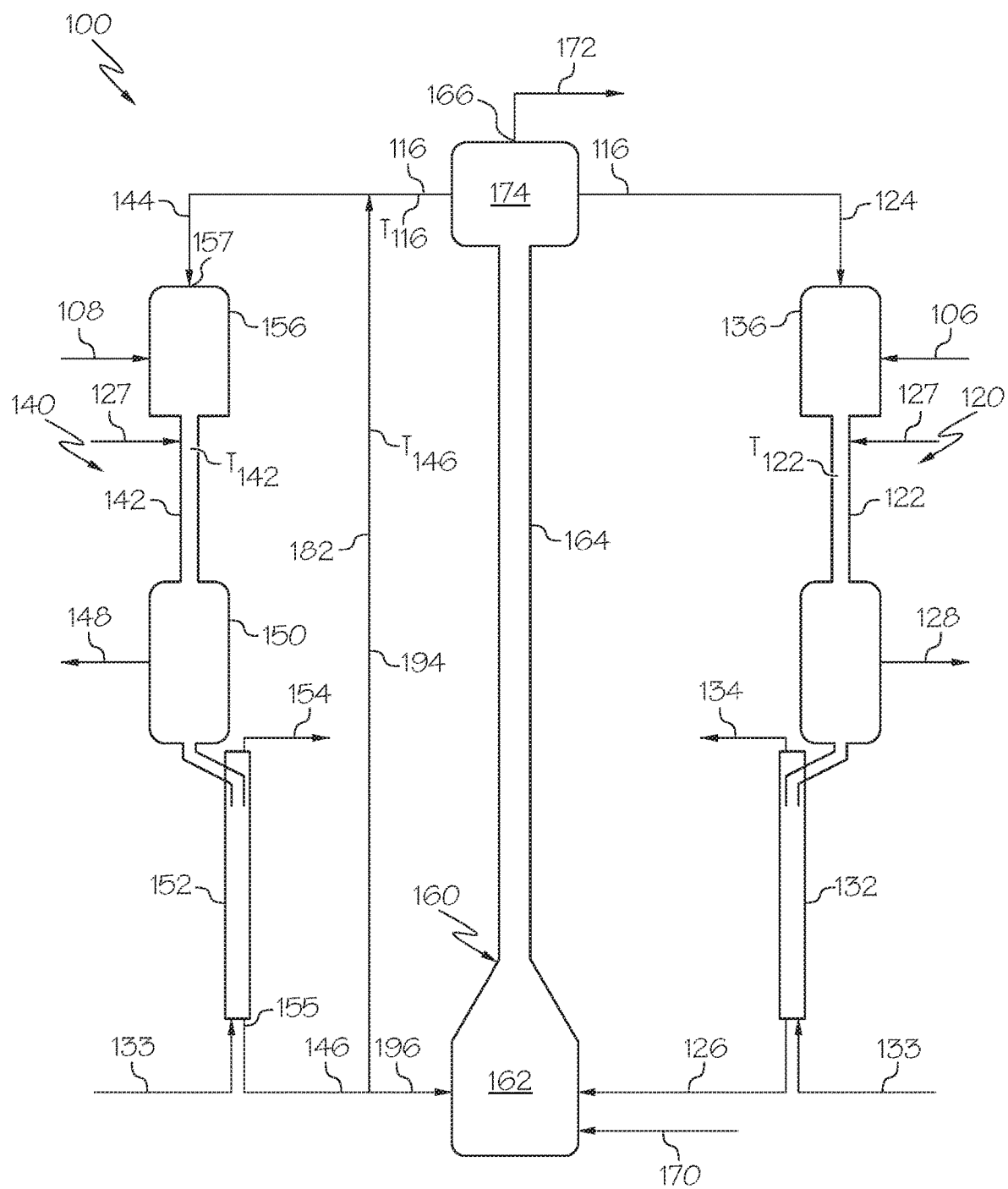
FIG. 3 depicts a schematic diagram of another embodiment of a HSFCC system, according to one or more embodiments described in this disclosure.

Referring to the embodiment of FIG. 3, the HSFCC system 100 may include a spent second catalyst recycle 182. The spent second catalyst recycle 182 may fluidly couple an outlet 155 of the second stripping zone 152 to an inlet 157 of the second catalyst/feed mixing zone 156. The spent second catalyst recycle 182 may pass the recycle portion 194 of the spent second catalyst 146 from the outlet 155 of the second stripping zone 152 to the inlet 157 of the second catalyst/feed mixing zone 156. The recycle portion 194 of the spent second catalyst 146 may be combined with regenerated catalyst 116 from the catalyst hopper 174 upstream of the second cracking reaction zone 142 such that the second catalyst 144 introduced to the second cracking reaction zone 142 comprises a mixture of the regenerated catalyst 116 and the recycle portion 194 of the spent second catalyst 146. In some embodiments, the recycle portion 194 of the spent second catalyst 146 may be introduced to the second catalyst/feed mixing zone 156 where the recycle portion 194 of the spent second catalyst 146 is mixed with the regenerated catalyst 116 and the lesser boiling point fraction stream 108 before passing the second catalyst 144 (mixture of the spent second catalyst 146 and the regenerated catalyst 116) and the lesser boiling point fraction stream 108 to the second cracking reaction zone 142. In other embodiments, the recycle portion 194 of the spent second catalyst 146 may be combined with the regenerated catalyst 116 upstream of the second catalyst/feed mixing zone 156. A non-recycle portion 196 of the spent second catalyst 146 may be passed to the regenerator 160 for regeneration.

The recycle portion 194 of the spent second catalyst 146 may have a spent second catalyst temperature $T_{146}$ that may be less than the regenerated catalyst temperature $T_{116}$ of the regenerated catalyst 116. Mixing the recycle portion 194 of the spent second catalyst 146 with the regenerated catalyst 116 may reduce the average temperature of the second catalyst 144 introduced to the second cracking reaction zone 142. Reducing the average temperature of the second catalyst 144 may reduce the second cracking temperature $T_{142}$ in the second cracking reaction zone 142.

Additionally, mixing the recycle portion 194 of the spent second catalyst 146 with the regenerated catalyst 116 may reduce the average catalytic activity of the second catalyst 144 introduced to the second cracking reaction zone 142. As previously discussed, during the cracking reaction in the second cracking reaction zone 142, coke deposits may form on the spent second catalyst 146. The coke deposits may block catalytically active sites on the spent second catalyst 146 reducing the catalytic effectiveness of the spent second catalyst 146. The spent second catalyst 146 may have lesser catalytic effectiveness compared to the regenerated catalyst 116. Therefore, mixing the recycle portion 194 of the spent second catalyst 146 with the regenerated catalyst 116 to provide the second catalyst 144 for the second cracking reaction zone 142 may reduce the average catalytic activity of the second catalyst 144 introduced to the second cracking reaction zone 142 compared to the catalytic activity of the regenerated catalyst 116.

Still referring to the embodiment of FIG. 3, the second catalyst 144 introduced to the second cracking reaction zone 142 may have a weight ratio of the spent second catalyst 146 to the regenerated catalyst 116 sufficient to reduce the second cracking temperature $T_{142}$ in the second cracking reaction zone 142 compared to the regenerated catalyst temperature $T_{116}$. In other embodiments, the second catalyst 144 introduced to the second cracking reaction zone 142 may have a weight ratio of the spent second catalyst 146 to the regenerated catalyst 116 sufficient to reduce the average catalytic activity of the second catalyst 144 introduced to the second cracking reaction zone 142 compared to the catalytic activity of the regenerated catalyst 116. The second catalyst 144 may have a weight ratio of the spent second catalyst 146 to the regenerated catalyst 116 sufficient to increase the yield of a petrochemical product in the second cracking reaction product stream 148 compared to the yield of the same petrochemical product attainable by feeding the regenerated catalyst 116 to the second cracking reaction zone 142 without the spent second catalyst 146. In embodiments, the second catalyst 144 introduced to the second cracking reaction zone 142 may have a weight ratio of the spent second catalyst 146 to the regenerated catalyst 116 of from 1:99 to 99:1, from 1:99 to 90:10, from 1:99 to 75:25, from 1:99 to 50:50, from 1:99 to 25:75, from 1:99 to 10:90, from 10:90 to 99:1, from 10:90 to 90:10, from 10:90 to 75:25, from 10:90 to 50:50, from 10:90 to 25:75, from 25:75 to 99:1, from 25:75 to 90:10, from 25:75 to 75:25, from 25:75 to 50:50, from 50:50 to 99:1, from 50:50 to 90:10, from 50:50 to 75:25, from 75:25 to 99:1, from 75:25 to 90:10, or from 90:10 to 99:1.

The weight ratio of the spent second catalyst 146 to the regenerated catalyst 116 in the second catalyst 144 introduced to the second cracking reaction zone 142 may be controlled to modify the reaction conditions in the second cracking reaction zone 142. For example, controlling the weight ratio of the spent second catalyst 146 to the regenerated catalyst 116 in the second catalyst 144 may control the second cracking temperature $T_{142}$, an average catalyst activity, or both in the second cracking reaction zone 142, which may enable increasing the yield of one or more petrochemical products in the second cracking reaction product stream 148. The weight ratio of the spent second catalyst 146 to the regenerated catalyst 116 may be controlled by controlling the flow rate of the recycle portion 194 of the spent second catalyst 146 through the spent second catalyst recycle 182, the flow rate of regenerated catalyst 116 from the catalyst hopper 174, or both. In embodiments, increasing the weight ratio of the spent second catalyst 146 to the regenerated catalyst 116 in the second catalyst 144 introduced to the second cracking reaction zone 142 may increase the yield of olefins, such as butene, propene, and other olefins for example, and may decrease the yield of gasolines. Alternatively, in other embodiments, decreasing the weight ratio of the spent second catalyst 146 to the regenerated catalyst 116 in the second catalyst 144 introduced to the second cracking reaction zone 142 may increase the yield of gasolines, and decrease the yield of olefins, such as butene, propene, and other olefins for example.

The weight ratio of the spent second catalyst 146 to the regenerated catalyst 116 in the second catalyst 144 introduced to the second cracking reaction zone 142 or the recycle rate of the spent second catalyst 146 may be controlled in response to the catalyst to hydrocarbon weight ratio in the second cracking reaction zone 142. Alternatively, the weight ratio of the spent second catalyst 146 to the regenerated catalyst 116 in the second catalyst 144 introduced to the second cracking reaction zone 142 or the recycle rate of the spent second catalyst 146 may be controlled in response to the product selectivity of the second cracking reaction zone 142, which may be determined by measuring the composition of the second cracking reaction product stream 148.

Figure 4:
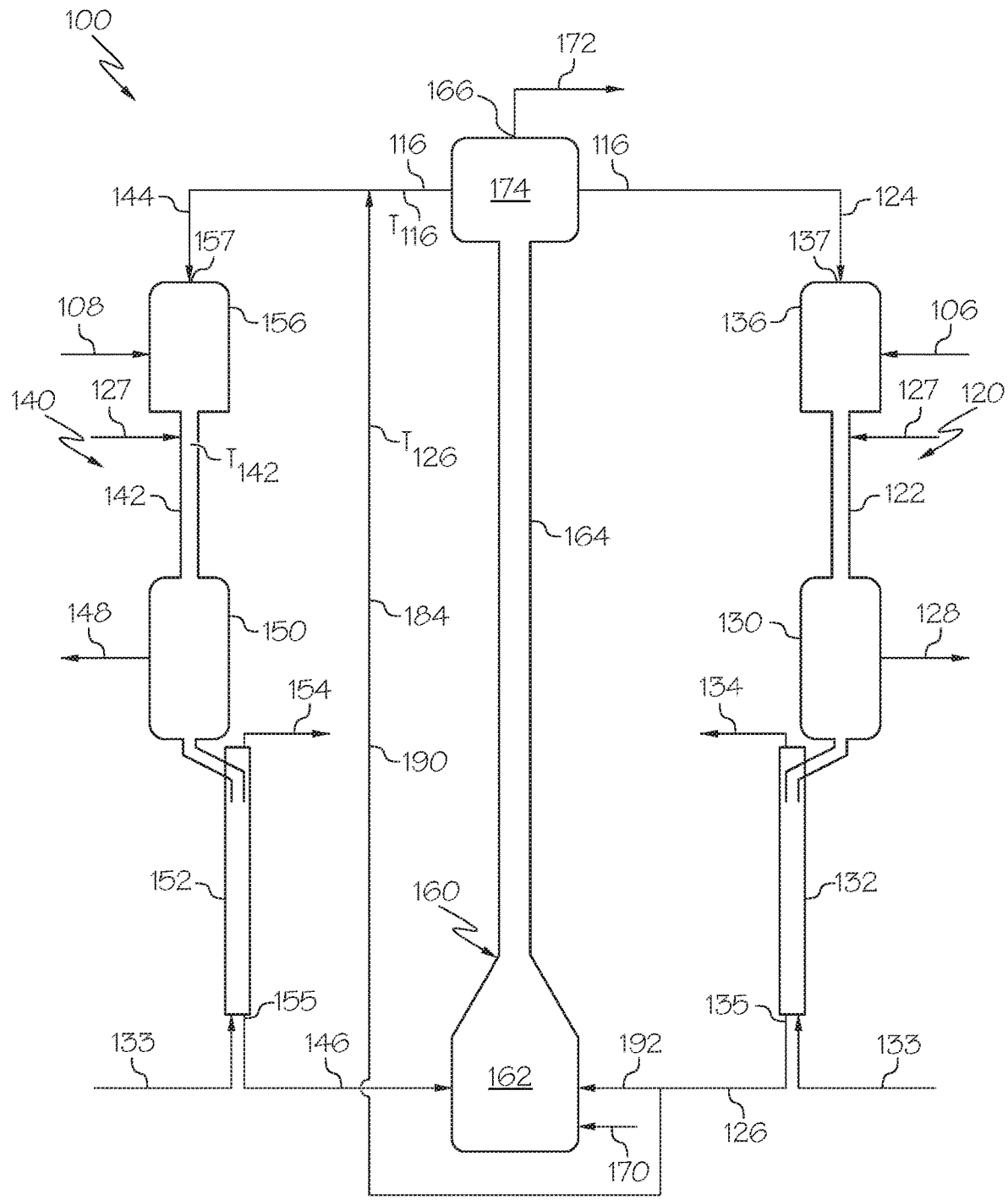
FIG. 4 depicts a schematic diagram of another embodiment of a HSFCC system, according to one or more embodiments described in this disclosure.

Referring to the embodiment of FIG. 4, the HSFCC system 100 may be configured to recycle the recycle portion 190 of the spent first catalyst 126 from the first stripping zone 132 to the second FCC unit 140. In these embodiments, the HSFCC system 100 may include a spent first catalyst cross-recycle 184 fluidly coupling the outlet 135 of the first stripping zone 132 to the inlet 157 of the second catalyst/feed mixing zone 156. The spent first catalyst cross-recycle 184 may pass the recycle portion 190 of the spent first catalyst 126 from the outlet 135 of the first stripping zone 132 to the inlet 157 of the first catalyst/feed mixing zone 136. The recycle portion 190 of the spent first catalyst 126 may be combined with regenerated catalyst 116 from the catalyst hopper 174 upstream of the second cracking reaction zone 142 such that the second catalyst 144 introduced to the second cracking reaction zone 142 comprises a mixture of the regenerated catalyst 116 and the recycle portion 190 of the spent first catalyst 126. In some embodiments, the recycle portion 190 of the spent first catalyst 126 may be introduced to the second catalyst/feed mixing zone 156 where the recycle portion 190 of the spent first catalyst 126 is mixed with the regenerated catalyst 116 and the lesser boiling point fraction stream 108 before passing the second catalyst 144 (mixture of the spent first catalyst 126 and regenerated catalyst 116) and the lesser boiling point fraction stream 108 to the second cracking reaction zone 142. In other embodiments, the recycle portion 190 of the spent first catalyst 126 may be combined with the regenerated catalyst 116 upstream of the second catalyst/feed mixing zone 156. The non-recycle portion 192 of the spent first catalyst 126 may be passed to the regenerator 160 for regeneration.

The recycle portion 190 of the spent first catalyst 126 may have a spent first catalyst temperature $T_{126}$ that is less than the regenerated catalyst temperature $T_{116}$ of the regenerated catalyst 116. Mixing of the recycle portion 190 of the spent first catalyst 126 with the regenerated catalyst 116 may reduce the average temperature of the second catalyst 144 introduced to the second cracking reaction zone 142. Reducing the average temperature of the second catalyst 144 may reduce the second cracking temperature $T_{142}$ in the second cracking reaction zone 142.

Additionally, mixing the recycle portion 190 of the spent first catalyst 126 with the regenerated catalyst 116 may reduce the average catalytic activity of the second catalyst 144 introduced to the second cracking reaction zone 142. As previously discussed, during the cracking reaction in the first cracking reaction zone 122, coke deposits may form on the spent first catalyst 126. The coke deposits may block catalytically active sites on the spent first catalyst 126 reducing the catalytic effectiveness of the spent first catalyst 126. The spent first catalyst 126 may have lesser catalytic effectiveness compared to the regenerated catalyst 116. Therefore, mixing the recycle portion 190 of the spent first catalyst 126 with the regenerated catalyst 116 to produce the second catalyst 144 may reduce the average catalytic activity of the second catalyst 144 introduced to the second cracking reaction zone 142 compared to the catalytic activity of the regenerated catalyst 116.

In further embodiments, the second catalyst 144 introduced to the second cracking reaction zone 142 may have a weight ratio of the spent first catalyst 126 to the regenerated catalyst 116 sufficient to reduce the second cracking temperature $T_{142}$ in the second cracking reaction zone 142 compared to the regenerated catalyst temperature $T_{116}$. In other embodiments, the second catalyst 144 introduced to the second cracking reaction zone 142 may have a weight ratio of the spent first catalyst 126 to the regenerated catalyst 116 sufficient to reduce the average catalytic activity of the second catalyst 144 introduced to the second cracking reaction zone 142 compared to the catalytic activity of the regenerated catalyst 116. The second catalyst 144 may have a weight ratio of the spent first catalyst 126 to the regenerated catalyst 116 sufficient to increase the yield of a petrochemical product in the second cracking reaction product stream 148 compared to the yield of the same petrochemical product attainable by feeding the regenerated catalyst 116 to the second cracking reaction zone 142 without the spent first catalyst 126. In embodiments, the second catalyst 144 introduced to the second cracking reaction zone 142 may have a weight ratio of the spent first catalyst 126 to the regenerated catalyst 116 of from 1:99 to 99:1, from 1:99 to 90:10, from 1:99 to 75:25, from 1:99 to 50:50, from 1:99 to 25:75, from 1:99 to 10:90, from 10:90 to 99:1, from 10:90 to 90:10, from 10:90 to 75:25, from 10:90 to 50:50, from 10:90 to 25:75, from 25:75 to 99:1, from 25:75 to 90:10, from 25:75 to 75:25, from 25:75 to 50:50, from 50:50 to 99:1, from 50:50 to 90:10, from 50:50 to 75:25, from 75:25 to 99:1, from 75:25 to 90:10, or from 90:10 to 99:1.

The weight ratio of the spent first catalyst 126 to the regenerated catalyst 116 in the second catalyst 144 introduced to the second cracking reaction zone 142 may be controlled to modify the reaction conditions in the second cracking reaction zone 142. For example, controlling the weight ratio of the spent first catalyst 126 to the regenerated catalyst 116 in the second catalyst 144 may control the second cracking temperature $T_{142}$, an average catalyst activity, or both in the second cracking reaction zone 142, which may enable improving the yield of one or more petrochemical products in the second cracking reaction product stream 148. The weight ratio of the spent first catalyst 126 to the regenerated catalyst 116 may be controlled by controlling the flow rate of the recycle portion 190 of the spent first catalyst 126 through the spent first catalyst cross-recycle 184, the flow rate of regenerated catalyst 116 from the catalyst hopper 174, or both. In embodiments, increasing the weight ratio of the spent first catalyst 126 to the regenerated catalyst 116 in the second catalyst 144 introduced to the second cracking reaction zone 142 may increase the yield of olefins, such as butene, propene, and other olefins for example, and may decrease the yield of gasolines in the second cracking reaction product stream 148. Alternatively, in other embodiments, decreasing the weight ratio of the spent first catalyst 126 to the regenerated catalyst 116 in the second catalyst 144 introduced to the second cracking reaction zone 142 may increase the yield of gasolines, and decrease the yield of olefins, such as butene, propene, and other olefins for example, in the second cracking reaction product stream 148.

The weight ratio of the spent first catalyst 126 to the regenerated catalyst 116 in the second catalyst 144 introduced to the second cracking reaction zone 142 or the recycle rate of the spent first catalyst 126 may be controlled in response to the catalyst to hydrocarbon weight ratio in the second cracking reaction zone 142. Alternatively, the weight ratio of the spent first catalyst 126 to the regenerated catalyst 116 in the second catalyst 144 introduced to the second cracking reaction zone 142 or the recycle rate of the spent first catalyst 126 may be controlled in response to the product selectivity of the second cracking reaction zone 142, which may be determined by measuring the composition of the second cracking reaction product stream 148.

Figure 5:
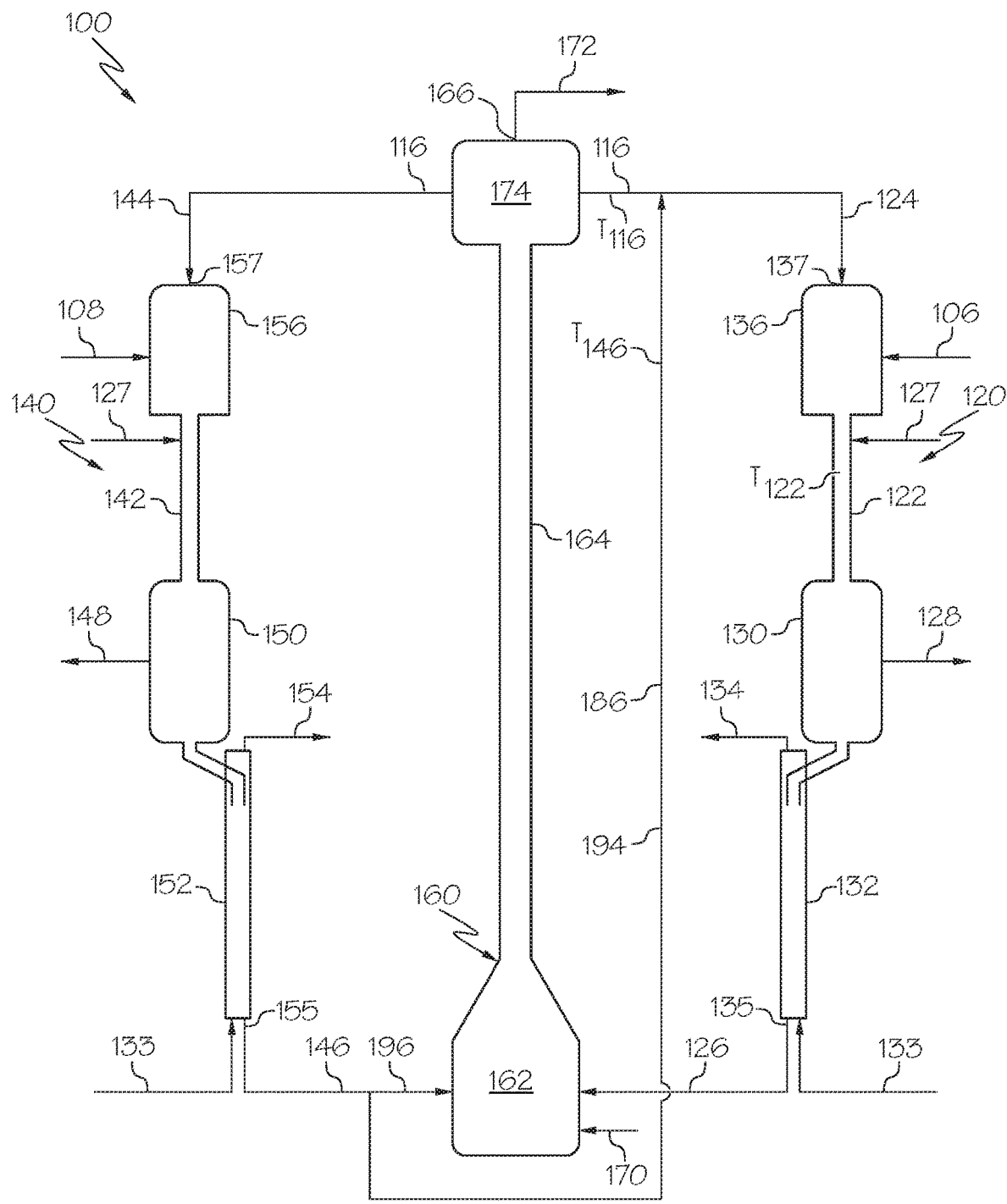
FIG. 5 depicts a schematic diagram of another embodiment of a HSFCC system, according to one or more embodiments described in this disclosure; and For the purpose of describing the simplified schematic illustrations and descriptions of FIGS. 1-5, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

Referring to the embodiment of FIG. 5, the HSFCC system 100 may be configured to recycle the recycle portion 194 of the spent second catalyst 146 from the second stripping zone 152 to the first FCC unit 120. In these embodiments, the HSFCC system 100 may include a spent second catalyst cross-recycle 186 fluidly coupling the outlet 155 of the second stripping zone 152 to the inlet 137 of the first catalyst/feed mixing zone 136. The spent second catalyst cross-recycle 186 may pass the recycle portion 194 of the spent second catalyst 146 from the outlet 155 of the second stripping zone 152 to the inlet 137 of the first catalyst/feed mixing zone 136. The recycle portion 194 of the spent second catalyst 146 may be combined with regenerated catalyst 116 from the catalyst hopper 174 upstream of the first cracking reaction zone 122 such that the first catalyst 124 introduced to the first cracking reaction zone 122 comprises a mixture of the regenerated catalyst 116 and the recycle portion 194 of the spent second catalyst 146. In some embodiments, the recycle portion 194 of the spent second catalyst 146 may be introduced to the first catalyst/feed mixing zone 136 where the recycle portion 194 of the spent second catalyst 146 is mixed with the regenerated catalyst 116 and the greater boiling point fraction stream 106 before passing the first catalyst 124 (the mixture of the spent second catalyst 146 and the regenerated catalyst 116) and the greater boiling point fraction stream 106 to the first cracking reaction zone 122. In other embodiments, the recycle portion 194 of the spent second catalyst 146 may be combined with the regenerated catalyst 116 upstream of the first catalyst/feed mixing zone 136. The non-recycle portion 196 of the spent second catalyst 146 may be passed to the regenerator 160 for regeneration.

The recycle portion 194 of the spent second catalyst 146 may have a spent second catalyst temperature $T_{146}$ that may be less than the regenerated catalyst temperature $T_{116}$ of the regenerated catalyst 116. Mixing the recycle portion 194 of the spent second catalyst 146 with the regenerated catalyst 116 may reduce the average temperature of the first catalyst 124 introduced to the first cracking reaction zone 122. Reducing the average temperature of the first catalyst 124 may reduce the first cracking temperature $T_{122}$ in the first cracking reaction zone 122.

Additionally, mixing the recycle portion 194 of the spent second catalyst 146 with the regenerated catalyst 116 may reduce the average catalytic activity of the first catalyst 124 introduced to the first cracking reaction zone 122. As previously discussed, during the cracking reaction in the second cracking reaction zone 142, coke deposits may form on the spent second catalyst 146. The coke deposits may block catalytically active sites on the spent second catalyst 146 reducing the catalytic effectiveness of the spent second catalyst 146. The spent second catalyst 146 may have lesser catalytic effectiveness compared to the regenerated catalyst 116. Therefore, mixing the recycle portion 194 of the spent second catalyst 146 with the regenerated catalyst 116 to provide the first catalyst 124 may reduce the average catalytic activity of the first catalyst 124 introduced to the first cracking reaction zone 122 compared to the catalytic activity of the regenerated catalyst 116.

Still referring to FIG. 5, the first catalyst 124 introduced to the first cracking reaction zone 122 may have a weight ratio of the spent second catalyst 146 to the regenerated catalyst 116 sufficient to reduce the first cracking temperature $T_{122}$ in the first cracking reaction zone 122 compared to the regenerated catalyst temperature $T_{116}$. In other embodiments, the first catalyst 124 introduced to the first cracking reaction zone 122 may have a weight ratio of the spent second catalyst 146 to the regenerated catalyst 116 sufficient to reduce the average catalytic activity of the first catalyst 124 introduced to the first cracking reaction zone 122 compared to the catalytic activity of the regenerated catalyst 116. The first catalyst 124 may have a weight ratio of the spent second catalyst 146 to the regenerated catalyst 116 sufficient to increase the yield of a petrochemical product in the first cracking reaction product stream 128 compared to the yield of the same petrochemical product attainable by feeding the regenerated catalyst 116 to the first cracking reaction zone 122 without the spent second catalyst 146. In embodiments, the first catalyst 124 introduced to the first cracking reaction zone 122 may have a weight ratio of the spent second catalyst 146 to the regenerated catalyst 116 of from 1:99 to 99:1, from 1:99 to 90:10, from 1:99 to 75:25, from 1:99 to 50:50, from 1:99 to 25:75, from 1:99 to 10:90, from 10:90 to 99:1, from 10:90 to 90:10, from 10:90 to 75:25, from 10:90 to 50:50, from 10:90 to 25:75, from 25:75 to 99:1, from 25:75 to 90:10, from 25:75 to 75:25, from 25:75 to 50:50, from 50:50 to 99:1, from 50:50 to 90:10, from 50:50 to 75:25, from 75:25 to 99:1, from 75:25 to 90:10, or from 90:10 to 99:1.

The weight ratio of the spent second catalyst 146 to the regenerated catalyst 116 in the first catalyst 124 introduced to the first cracking reaction zone 122 may be controlled to modify the reaction conditions in the first cracking reaction zone 122. For example, controlling the weight ratio of the spent second catalyst 146 to the regenerated catalyst 116 in the first catalyst 124 may control the first cracking temperature $T_{122}$, an average catalyst activity, or both in the first cracking reaction zone 122, which may enable improving the yield of one or more petrochemical products in the first cracking reaction product stream 128. The weight ratio of the spent second catalyst 146 to the regenerated catalyst 116 may be controlled by controlling the flow rate of the recycle portion 194 of the spent second catalyst 146 through the spent second catalyst cross-recycle 186, the flow rate of regenerated catalyst 116 from the catalyst hopper 174, or both. In embodiments, increasing the weight ratio of the spent second catalyst 146 to the regenerated catalyst 116 in the first catalyst 124 introduced to the first cracking reaction zone 122 may increase the yield of olefins, such as butene, propene, and other olefins for example, and may decrease the yield of gasolines. Alternatively, in other embodiments, decreasing the weight ratio of the spent second catalyst 146 to the regenerated catalyst 116 in the first catalyst 124 introduced to the first cracking reaction zone 122 may increase the yield of gasolines, and decrease the yield of olefins, such as butene, propene, and other olefins for example.

The weight ratio of the spent second catalyst 146 to the regenerated catalyst 116 in the first catalyst 124 introduced to the first cracking reaction zone 122 or the recycle rate of the spent second catalyst 146 may be controlled in response to the catalyst to hydrocarbon weight ratio in the first cracking reaction zone 122. Alternatively, the weight ratio of the spent second catalyst 146 to the regenerated catalyst 116 in the first catalyst 124 introduced to the first cracking reaction zone 122 or the recycle rate of the spent second catalyst 146 may be controlled in response to the product selectivity of the first cracking reaction zone 122, which may be determined by measuring the composition of the first cracking reaction product stream 128.

Referring to FIGS. 2-5, the HSFCC systems 100 having at least one of the spent first catalyst recycle 180 (FIG. 2), the spent second catalyst recycle 182 (FIG. 3), the spent first catalyst cross-recycle 184 (FIG. 4), the spent second catalyst cross-recycle 186 (FIG. 5), or combinations of these, may enable operation of the first FCC unit 120 and the second FCC unit 140 at different cracking temperatures or with different catalytic activities while enabling regeneration of the spent first catalyst 126 and spent second catalyst 146 in a single common regenerator 160. The amount of coke produced and deposited on the spent first catalyst 126 from cracking the greater boiling point fraction 106 in the first cracking reaction zone 122 may compensate for the limited amount of coke formed and deposited on the spent second catalyst 146 from cracking the lesser boiling point fraction 108 in the second cracking reaction zone 142. In the regenerator 160, the spent first catalyst 126 and the spent second catalyst 146 may be combined such that the heat from regeneration of the spent first catalyst 126 is transferred to all of the regenerated catalyst 116. The regenerated catalyst 116 may then distribute the heat to both the first FCC unit 120 and the second FCC unit 140.

Additionally, the HSFCC systems 100 having at least a partial spent catalyst recycle, such as at least one of the spent first catalyst recycle 180, the spent second catalyst recycle 182, the spent first catalyst cross-recycle 184, the spent second catalyst cross-recycle 186, or combinations of these, may enable control of the catalytic activity in the first FCC unit 120, second FCC unit 140, or both independent of the other FCC unit. Hydrocarbon feed streams 102 may have wide boiling ranges. Fractions with higher boiling points, such as the greater boiling point fraction 106, may tend to be more reactive, requiring less cracking activity compared to the fractions having lighter boiling points, such as the lesser boiling point fraction 108. Recycling a portion of the spent first catalyst 126 or spent second catalyst 146 and mixing it with the regenerated catalyst 116 may enable control of the catalytic activity, temperature, or both of the first catalyst 124 or second catalyst 144 introduced to the first FCC unit 120 or the second FCC unit 140, respectively, to adjust for the difference in relative reactivity of the greater boiling point fraction 106 and the lesser boiling point fraction 108. Control of the catalytic activity may enable modification of the composition of the first cracking reaction product stream 128, the second cracking reaction product stream 148, or both compared to the compositions obtained using regenerated catalyst for both the first FCC unit 120 and the second FCC unit 140.

The HSFCC system 100 may be utilized in a method for producing olefins from the hydrocarbon feed stream 102. The method for producing olefins may include separating a hydrocarbon material into a lesser boiling point fraction 108 and a greater boiling point fraction 106, cracking at least a portion of the greater boiling point fraction 106 in the presence of a first catalyst 124 at a first cracking temperature $T_{122}$ of from 500° C. to 700° C. to produce a first cracking reaction product 128 and a spent first catalyst 126, and cracking at least a portion of the lesser boiling point fraction 108 in the presence of a second catalyst 144 at a second cracking temperature $T_{142}$ of from 500° C. to 700° C. to produce a second cracking reaction product 148 and a spent second catalyst 146. The method may further include separating at least a portion of the first cracking reaction product 128 from the spent first catalyst 126 and separating at least a portion of the second cracking reaction product 148 from the spent second catalyst 146. The method may include combining a first portion (recycle portion 190) of the spent first catalyst 126 and a regenerated catalyst 116 to produce the first catalyst 124 or the second catalyst 144 and recovering the first cracking reaction product 128 and the second cracking reaction product 148. The hydrocarbon material may comprise at least one of a crude oil, vacuum residue, tar sands, bitumen, atmospheric residue, vacuum gas oils, demetalized oils, naphtha streams, or combinations of these. In some embodiments, the hydrocarbon material may comprise crude oil. The method may further include regenerating a second portion (non-recycle portion 192) of the spent first catalyst 126 and the spent second catalyst 146 to produce the regenerated catalyst 116. The greater boiling point fraction 106 and the lesser boiling point fraction 108 may be cracked under high-severity conditions comprising a weight ratio of catalyst to hydrocarbon of greater than 5:1 and a residence time of less than 3 seconds.

In other embodiments, a method for operating the system 100 having a first fluid catalytic cracking (FCC) unit 120 and a second FCC unit 140 for producing products from a hydrocarbon feed stream 102 may include introducing a hydrocarbon feed stream 102 to a feed separator 104, separating the hydrocarbon feed stream 102 into a lesser boiling point fraction 108 and a greater boiling point fraction 106 in the feed separator 104, passing the greater boiling point fraction 106 to the first FCC unit 120, and passing the lesser boiling point fraction 108 to the second FCC unit 140, where the first FCC unit 120 and the second FCC unit 140 are downflow FCC units. The method may further include cracking at least a portion of the greater boiling point fraction 106 in the first FCC unit 120 in the presence of a first catalyst 124 at a first cracking temperature of from 500° C. to 700° C. to produce a first cracking reaction product 128 and a spent first catalyst 126, and cracking at least a portion of the lesser boiling point fraction 108 in the second FCC unit 140 in the presence of a second catalyst 144 and at a second cracking temperature of from 500° C. to 700° C. to produce a second cracking reaction product 148 and a spent second catalyst 146. The method may include passing at least a portion of the spent first catalyst 126 or a portion of the spent second catalyst 146 to the first FCC unit 120 or the second FCC unit 140.

The method may further include regenerating a non-recycle portion 192 of the spent first catalyst 126 and a non-recycle portion 196 of the spent second catalyst 146 in a regeneration zone 162 to produce a regenerated catalyst 116. The method may include passing the regenerated catalyst 116 to the first FCC unit 120 and the second FCC unit 140. The method may include recovering the first cracking reaction product 128 and the second cracking reaction product 148.

In some embodiments, the method may include passing the at least a portion of the spent first catalyst 126 to the first FCC unit 120, the second FCC unit 140, or the first FCC unit 120 and the second FCC unit 140. For example, in embodiments, the method may include passing the at least a portion of the spent first catalyst 126 to the first FCC unit 120. The first catalyst 124 may comprise the at least a portion of the spent first catalyst 126 and the regenerated catalyst 116, and the second catalyst 144 may comprise the regenerated catalyst 116. The method may include controlling the catalytic activity of the first catalyst 124 in the first FCC unit 120 or the first cracking temperature $T_{122}$ in the first FCC unit 120 by adjusting a weight ratio of the at least a portion of the spent first catalyst 126 to the regenerated catalyst 116 in the first catalyst 124.

In an alternative example, in other embodiments, the method may include passing the at least a portion of the spent first catalyst 126 to the second FCC unit 140. The second catalyst 144 may include the at least a portion of the spent first catalyst 126 and the regenerated catalyst 116, and the first catalyst 124 may include the regenerated catalyst 116. The method may include controlling the catalytic activity of the second catalyst 144 in the second FCC unit 140 or the second cracking temperature $T_{142}$ in the second FCC unit 140 by adjusting a weight ratio of the at least a portion of the spent first catalyst 126 to the regenerated catalyst 116 in the second catalyst 144.

In some embodiments, the method may include passing at least a portion of the spent second catalyst 146 to the first FCC unit 120, the second FCC unit 140, or the first FCC unit 120 and the second FCC unit 140. For example, in embodiments, the method may include passing the at least a portion of the spent second catalyst 146 to the second FCC unit 140. The second catalyst 144 may comprise the at least a portion of the spent second catalyst 146 and the regenerated catalyst 116. The method may include controlling the catalytic activity of the second catalyst 144 in the second FCC unit 140 or the second cracking temperature $T_{142}$ in the second FCC unit 140 by adjusting a weight ratio of the at least a portion of the spent second catalyst 146 to the regenerated catalyst 116 in the second catalyst 144.

In an alternative example, the method may include passing the at least a portion of the spent second catalyst 146 to the first FCC unit 120. In this example, the first catalyst 124 may comprise the at least a portion of the spent second catalyst 146 and the regenerated catalyst 116. The method may further include controlling the catalytic activity of the first catalyst 124 in the first FCC unit 120 or the first cracking temperature $T_{122}$ in the first FCC unit 120 by adjusting a weight ratio of the at least a portion of the spent second catalyst 146 to the regenerated catalyst 116 in the first catalyst 124.

EXAMPLES

The following examples illustrate one or more additional features of the present disclosure previously described. In the following examples, a hydrocarbon feed stream was cracked in the presence of catalyst samples that contained mixtures of spent catalyst and fresh catalyst to simulate partial recycle of spent catalyst in the HSFCC system 100 described in this disclosure. The hydrocarbon feed stream was a vacuum gas oil (VGO) feed.

An ACE Technology® model R+ cracking unit was used for carrying out the catalytic cracking experiments. For each example reaction, the cracking unit was operated at a cracking temperature of 600° C. and a weight ratio of catalyst to hydrocarbon of 12. At the start of operation of the cracking unit for each example, a fixed quantity of catalyst was transferred to the reactor and heated to the desired reaction temperature of 600° C. with nitrogen gas. The nitrogen gas was fed through the feed injector and into the reactor from the bottom of the reactor to keep the catalyst particles fluidized. When the catalyst bed temperature reached within ±1° C. of the reaction temperature of 600° C., the feed was injected for a preset duration of time of 30 seconds. During the 30 second injection time, the VGO passed through the catalyst continuously. The feed pump was calibrated at the feed temperature to deliver an amount of the VGO feed to maintain the desired catalyst to oil weight ratio of 12.

For each example cracking reaction, the cracking reaction product stream exiting the reactor was passed through the liquid receiver in which $C_{5+}$ hydrocarbons were condensed. The liquid receiver was operated at a temperature of −15° C. The remaining gases of the cracking reaction product stream were passed to the gas receiver. Following the cracking reaction, the catalyst was stripped of reaction products at a stripping temperature of 600° C. The total gas and liquid products were each collected from the stripping operation and analyzed for composition.

As an initial step, the VGO feed was cracked in the ACE Technology® cracking unit using fresh catalyst to generate spent catalyst. The fresh catalyst included 75 wt. % commercially available FCC base catalyst and 25 wt. % commercially available FCC olefin additive. After the stripping process, the spent catalyst was removed from the reactor without regenerating the spent catalyst. Catalyst samples were then prepared by mixing different amounts of the spent catalyst with fresh catalyst. Catalyst samples were prepared having 25 weight percent (wt. %), 50 wt. %, and 75 wt. % spent catalyst based on the total weight of each of the catalyst samples. Each of the catalyst samples were then separately charged to the reactor of the ACE Technology® cracking unit and used to crack a quantity of the VGO feed at high-severity conditions of 600° C. and a weight ratio of catalyst to oil of 12 according to the process previously described in this disclosure. The reaction product streams were analyzed for total conversion and yields of hydrogen ($H_2$), methane, ethane, ethylene, propane, propene, butane, isobutene, 1-butene, isobutene, 2-butene, 1,3-butadiene, total gas, gasoline, light cycle oil (LCO, 216-343° C.), and heavy cycle oil (HCO, >343° C.). The results obtained for the total conversion and yields for each of the catalyst samples is provided in Table 2.

For each catalyst sample having the spent catalyst, after catalyst stripping was completed, the reactor temperature was raised to 650° C., and air was fed to the reactor to regenerate the catalyst. During regeneration, the coke on spent catalyst was burned at the temperature of 650° C. under air flow. The flue gas generated during regeneration was passed thru an infrared (IR) carbon dioxide ($CO_2$) analyzer. The amount of coke burned during regeneration was calculated from the gas flow rate of the flue gas and the concentration of $CO_2$ in the flue gas. The yield of coke produced by the cracking reaction was calculated from the difference between amount of coke burned during regeneration and the amount of coke in the spent catalyst prior to combination of the spent catalyst with the fresh catalyst and introduction of the catalyst to the reactor.

TABLE 2

Total Conversion and Yield for Cracking Reactions Conducted with Catalyst Having 25 wt. %, 50 wt. % and 75 wt. % Spent Catalyst.

| Spent Catalyst (wt. %) | 25 | 50 | 75 |
| --- | --- | --- | --- |
| Cracking Temperature (° C.) | 600 | 600 | 600 |
| Catalyst to Oil Weight Ratio | 12.06 | 12.05 | 12.04 |
| Total Conversion (%) | 80.59 | 78.78 | 78.61 |
| Hydrogen (H2) Yield (wt. %) | 0.22 | 0.23 | 0.22 |
| Methane Yield (wt. %) | 1.51 | 1.47 | 1.17 |
| Ethane Yield (wt. %) | 1.51 | 1.47 | 1.17 |
| Ethylene Yield (wt. %) | 7.08 | 7.39 | 7.58 |
| Propane Yield (wt. %) | 4.70 | 4.25 | 3.36 |
| Propene Yield (wt. %) | 15.84 | 17.81 | 21.56 |
| Isobutane Yield (wt. %) | 4.39 | 3.70 | 3.27 |
| n-Butane Yield (wt. %) | 1.46 | 1.31 | 1.12 |
| 1-Butene Yield (wt. %) | 2.13 | 2.21 | 2.48 |
| cis-2-Butene Yield (wt. %) | 2.33 | 2.41 | 2.68 |
| trans-2-Butene Yield (wt. %) | 3.28 | 3.4 | 3.77 |
| Isobutene Yield (wt. %) | 5.26 | 5.26 | 5.49 |
| 1,3-Butadiene (wt. %) | 0.03 | 0.03 | 0.09 |
| Total Gas (wt. %) | 49.73 | 50.94 | 53.97 |
| Gasoline (C5-216° C.) (wt. %) | 27.62 | 24.92 | 23.13 |
| LCO (216-343° C.) (wt. %) | 11.11 | 11.49 | 11.26 |
| HCO (>343° C.) (wt. %) | 8.3 | 9.73 | 10.13 |
| Coke Yield (wt. %) | 3.03 | 2.68 | 1.30 |

As shown in Table 2, the yield of olefins increased with increasing weight percent of the spent catalyst recycled into the reactor. Specifically, the yield of propene increased from 15.84 wt. % using 25 wt. % spent catalyst based on the total catalyst in the reactor to 21.56 wt. % using 75 wt. % spent catalyst based on the total catalyst in the reactor. Thus, increasing the amount of spent catalyst from 25 wt. % to 75 wt. % resulted in an unexpected increased in the yield of propene by 36%. Similarly, the yields of other olefins also unexpectedly increased with increasing weight percent of spent catalyst. The yield of 1-butene increased by 16% from 2.13 wt. % (at 25 wt. % spent catalyst) to 2.48 wt. % (at 75 wt. % spent catalyst), the yield of cis-2-butene increased by 15% from 2.33 wt. % (at 25 wt. % spent catalyst) to 2.68 wt. % (at 75 wt. % spent catalyst), and the yield of trans-2-butene increased by 15% from 3.28 wt. % (at 25 wt. % spent catalyst) to 3.77 wt. % (at 75 wt. % spent catalyst). In addition to olefins, Table 2 also shows that the yield of HCO increased with increasing amount of spent catalyst charged to the reactor. The yield of HCO increased by 22 wt. % from 8.3 wt. % (at 25 wt. % spent catalyst) to 10.13 wt. % (at 75 wt. % spent catalyst).

In contrast, the yield of gasoline unexpectedly decreased with increasing weight percent of spent catalyst recycled to the reactor. The yield of gasoline unexpectedly decreased from 27.62 wt. % gasoline at 25 wt. % spent catalyst recycled to the reactor to 23.13 wt. % gasoline at 75 wt. % spent catalyst recycled to the reactor. Thus, increasing the amount of spent catalyst from 25 wt. % to 75 wt. % resulted in an unexpected decrease in the yield of gasoline by 16%. Additionally, the overall conversion decreased with increasing weight percent of spent catalyst recycled to the reactor. The total conversion decreased from 80.59% at 25 wt. % spent catalyst recycled to the reactor to 78.61% at 75 wt. % spent catalyst recycled to the reactor. Thus, increasing the amount of spent catalyst from 25 wt. % to 75 wt. % resulted in a decrease in the total conversion of 2.5%.

These results demonstrate that changing the amount of the spent catalyst recycled back to the FCC reactor changes the product distribution in the cracking reaction product streams and, thus, changes the composition of the cracking reaction product streams. Thus, the amount of spent catalyst recycled back to the FCC reactor may be controlled to produce a product distribution favoring a specific target product. For Example, based on the results in Table 2, the yield of propene and other olefins from a high-severity FCC reactor may be increased by increasing the amount of spent catalyst recycled back to the FCC reactor. Alternatively, the yield of gasoline may be increased by decreasing the amount of spent catalyst recycled back to the FCC reactor.

A first aspect of the present disclosure may be directed to a method for operating a system having a first fluid catalytic cracking (FCC) unit and a second FCC unit for producing products from a hydrocarbon feed stream, the method comprising: introducing a hydrocarbon feed stream to a feed separator; separating the hydrocarbon feed stream into a lesser boiling point fraction and a greater boiling point fraction in the feed separator; passing the greater boiling point fraction to the first FCC unit; passing the lesser boiling point fraction to the second FCC unit, where the first FCC unit and the second FCC unit are downflow FCC units; cracking at least a portion of the greater boiling point fraction in the first FCC unit in the presence of a first catalyst at a first cracking temperature of from 500° C. to 700° C. to produce a first cracking reaction product and a spent first catalyst; cracking at least a portion of the lesser boiling point fraction in the second FCC unit in the presence of a second catalyst and at a second cracking temperature of from 500° C. to 700° C. to produce a second cracking reaction product and a spent second catalyst; and passing at least a portion of the spent first catalyst or a portion of the spent second catalyst to the first FCC unit or the second FCC unit.

A second aspect of the present disclosure may include the first aspect where the hydrocarbon feed stream comprises crude oil.

A third aspect of the present disclosure may include the first or the second aspect where the first FCC unit and the second FCC unit are High-Severity Fluidized Catalytic Cracking (HSFCC) units.

A fourth aspect of the present disclosure may include the third aspect where a weight ratio of catalyst to hydrocarbon in the first FCC unit and the second FCC unit is greater than 5 and a residence time in the first FCC unit and the second FCC unit is less than 3 seconds.

A fifth aspect of the present disclosure may include the first through fourth aspects further comprising regenerating a non-recycled portion of the spent first catalyst and a non-recycled portion of the spent second catalyst in a regeneration zone to produce a regenerated catalyst.

A sixth aspect of the present disclosure may include the fifth aspect further comprising passing the regenerated catalyst to the first FCC unit and the second FCC unit.

A seventh aspect of the present disclosure may include the first through sixth aspects further comprising recovering the first cracking reaction product and the second cracking reaction product.

An eighth aspect of the present disclosure may include the first through seventh aspects comprising passing the at least a portion of the spent first catalyst to the first FCC unit, the second FCC unit, or the first FCC unit and the second FCC unit.

A ninth aspect of the present disclosure may include the eighth aspect comprising passing the at least a portion of the spent first catalyst to the first FCC unit.

A tenth aspect of the present disclosure may include the ninth aspect where the first catalyst comprises the at least a portion of the spent first catalyst and the regenerated catalyst and the second catalyst comprises the regenerated catalyst.

An eleventh aspect of the present disclosure may include the tenth aspect where the first catalyst comprises a weight ratio of the at least a portion of the spent first catalyst to the regenerated catalyst of from 1:99 to 99:1, from 10:90 to 90:10, or from 25:75 to 75:25.

A twelfth aspect of the present disclosure may include the tenth aspect further comprising controlling the catalytic activity of the first catalyst in the first FCC unit or the first cracking temperature in the first FCC unit by adjusting a weight ratio of the at least a portion of the spent first catalyst to the regenerated catalyst in the first catalyst.

A thirteenth aspect of the present disclosure may include the ninth through twelfth aspects further comprising mixing the at least a portion of the spent first catalyst, the regenerated catalyst, and the greater boiling point fraction in a first mixing zone positioned upstream of a first cracking reaction zone of the first FCC unit.

A fourteenth aspect of the present disclosure may include the first through twelfth aspects further comprising mixing the first catalyst and the greater boiling point fraction in a first mixing zone positioned upstream of a first cracking reaction zone of the first FCC unit and mixing the second catalyst with the lesser boiling point fraction in a second mixing zone positioned upstream of a second cracking reaction zone of the second FCC unit.

A fifteenth aspect of the present disclosure may include the eighth through fourteenth aspects further comprising: separating the spent first catalyst from at least a portion of the first cracking reaction product in a first separation zone before passing the at least a portion of the spent first catalyst to the first FCC unit, the second FCC unit, or the first FCC unit and the second FCC unit; and separating the spent second catalyst from at least a portion of the second cracking reaction product in a second separation zone before regenerating the spent second catalyst.

A sixteenth aspect of the present disclosure may include the eighth through fifteenth aspects further comprising stripping another portion of the first cracking reaction product from the spent first catalyst before passing the at least a portion of the spent first catalyst to the first FCC unit, the second FCC unit, or the first FCC unit and the second FCC unit and regenerating a non-recycled portion of the spent first catalyst.

A seventeenth aspect of the present disclosure may include the first through eighth aspects comprising passing the at least a portion of the spent first catalyst to the second FCC unit.

An eighteenth aspect of the present disclosure may include the seventeenth aspect where the second catalyst comprises the at least a portion of the spent first catalyst and the regenerated catalyst.

A nineteenth aspect of the present disclosure may include the seventeenth through eighteenth aspects where the first catalyst comprises the regenerated catalyst.

A twentieth aspect of the present disclosure may include the eighteenth aspect where the second catalyst comprises a weight ratio of the at least a portion of the spent first catalyst to the regenerated catalyst of from 1:99 to 99:1, from 10:90 to 90:10, or from 25:75 to 75:25.

A twenty-first aspect of the present disclosure may include the eighteenth aspect further comprising controlling a catalytic activity of the second catalyst in the second FCC unit or the second cracking temperature in the second FCC unit by adjusting a weight ratio of the at least a portion of the spent first catalyst to the regenerated catalyst in the second catalyst.

A twenty-second aspect of the present disclosure may include the seventeenth through twenty-first aspects further comprising mixing the at least a portion of the spent first catalyst, the regenerated catalyst, and the lesser boiling point fraction in a second mixing zone positioned upstream of a second cracking reaction zone of the second FCC unit.

A twenty-third aspect of the present disclosure may include the first through seventh aspects comprising passing at least a portion of the spent second catalyst to the first FCC unit, the second FCC unit, or the first FCC unit and the second FCC unit.

A twenty-fourth aspect of the present disclosure may include the twenty-third aspect comprising passing the at least a portion of the spent second catalyst to the second FCC unit.

A twenty-fifth aspect of the present disclosure may include the twenty-fourth aspect where the second catalyst comprises the at least a portion of the spent second catalyst and the regenerated catalyst.

A twenty-sixth aspect of the present disclosure may include the twenty-fifth aspect where the second catalyst comprises a weight ratio of the at least a portion of the spent second catalyst to the regenerated catalyst of from 1:99 to 99:1, from 10:90 to 90:10, or from 25:75 to 75:25.

A twenty-seventh aspect of the present disclosure may include the twenty-fifth aspect further comprising controlling a catalytic activity of the second catalyst in the second FCC unit or the second cracking temperature in the second FCC unit by adjusting a weight ratio of the at least a portion of the spent second catalyst to the regenerated catalyst in the second catalyst.

A twenty-eighth aspect of the present disclosure may include the twenty-fourth through twenty-seventh aspects further comprising mixing the at least a portion of the spent second catalyst, the regenerated catalyst, and the lesser boiling point fraction in a second mixing zone positioned upstream of a second cracking reaction zone of the second FCC unit.

A twenty-ninth aspect of the present disclosure may include the twenty-third aspect further comprising: separating the spent first catalyst from at least a portion of the first cracking reaction product in a first separating zone before regenerating the spent first catalyst; and separating the spent second catalyst from at least a portion of the second cracking reaction product in a second separating zone before passing the at least a portion of the spent second catalyst to the first FCC unit, the second FCC unit, or the first FCC unit and the second FCC unit.

A thirtieth aspect of the present disclosure may include the twenty-ninth aspect further comprising stripping another portion of the second cracking reaction product from the spent second catalyst before passing the at least a portion of the spent second catalyst to the first FCC unit, the second FCC unit, or the first FCC unit and the second FCC unit and regenerating a non-recycled portion of the spent second catalyst.

A thirty-first aspect of the present disclosure may include the twenty-third aspect comprising passing the at least a portion of the spent second catalyst to the first FCC unit.

A thirty-second aspect of the present disclosure may include the thirty-first aspect where the first catalyst comprises the at least a portion of the spent second catalyst and the regenerated catalyst.

A thirty-third aspect of the present disclosure may include the thirty-second aspect where the first catalyst comprises a weight ratio of the at least a portion of the spent second catalyst to the regenerated catalyst of from 1:99 to 99:1, from 10:90 to 90:10, or from 25:75 to 75:25.

A thirty-fourth aspect of the present disclosure may include the thirty-second aspect further comprising controlling a catalytic activity of the first catalyst in the first FCC unit or the first cracking temperature in the first FCC unit by adjusting a weight ratio of the at least a portion of the spent second catalyst to the regenerated catalyst in the first catalyst.

A thirty-fifth aspect of the present disclosure may include the thirty-first through thirty-fourth aspects further comprising mixing the at least a portion of the spent second catalyst, the regenerated catalyst, and the greater boiling point fraction in a first mixing zone positioned upstream of a first cracking reaction zone of the first FCC unit.

A thirty-sixth aspect of the present disclosure may include the first through thirty-fifth aspects where the first catalyst and the second catalyst are high-activity FCC catalysts.

A thirty-seventh aspect of the present disclosure may include the thirty-sixth aspect where at least a portion of the first catalyst and the second catalyst comprises a ZSM-5 zeolite catalyst.

A thirty-eighth aspect of the present disclosure may include the first through thirty-seventh aspects where the hydrocarbon feed stream comprises at least one of a crude oil, vacuum residue, tar sands, bitumen, atmospheric residue, vacuum gas oils, demetalized oils, naphtha streams, or combinations of these.

A thirty-ninth aspect of the present disclosure may include the first through thirty-eighth aspects where the first cracking reaction product or the second cracking reaction product comprises one or more of ethylene, propene, butene, or pentene.

A fortieth aspect of the present disclosure may include the first through thirty-eighth aspects where the first cracking reaction product or the second cracking reaction product comprises gasoline.

A forty-first aspect of the present disclosure is directed to a method for producing olefins, the method comprising: separating a hydrocarbon material into a lesser boiling point fraction and a greater boiling point fraction; cracking at least a portion of the greater boiling point fraction in the presence of a first catalyst at a first cracking temperature of from 500° C. to 700° C. to produce a first cracking reaction product and a spent first catalyst; cracking at least a portion of the lesser boiling point fraction in the presence of a second catalyst at a second cracking temperature of from 500° C. to 700° C. to produce a second cracking reaction product and a spent second catalyst; separating at least a portion of the first cracking reaction product from the spent first catalyst; separating at least a portion of the second cracking reaction product from the spent second catalyst; combining a first portion of the spent first catalyst and a regenerated catalyst to produce the first catalyst or the second catalyst; and recovering the first cracking reaction product and the second cracking reaction product.

A forty-second aspect of the present disclosure may include the forty-first aspect where the hydrocarbon material comprises crude oil.

A forty-third aspect of the present disclosure may include the forty-first aspect where the hydrocarbon material comprises at least one of a crude oil, vacuum residue, tar sands, bitumen, atmospheric residue, vacuum gas oils, demetalized oils, naphtha streams, or combinations of these.

A forty-fourth aspect of the present disclosure may include the forty-first through forty-third aspects where the first cracking reaction product or the second cracking reaction product comprises one or more of ethylene, propene, butene, or pentene.

A forty-fifth aspect of the present disclosure may include the forty-first through forty-fourth aspects further comprising regenerating a second portion of the spent first catalyst and the spent second catalyst to produce the regenerated catalyst.

A forty-sixth aspect of the present disclosure may include the forty-first through forty-fifth aspects where the first catalyst comprises the first portion of the spent first catalyst and the regenerated catalyst.

A forty-seventh aspect of the present disclosure may include the forty-sixth aspect where the first catalyst comprises a weight ratio of the first portion of the spent first catalyst to the regenerated catalyst of from 1:99 to 99:1, or from 10:90 to 90:10, or from 25:75 to 75:25.

A forty-eighth aspect of the present disclosure may include the forty-first through forty-fifth aspects where the second catalyst comprises the first portion of the spent first catalyst and the regenerated catalyst.

A forty-ninth aspect of the present disclosure may include the forty-eighth aspect where the second catalyst comprises a weight ratio of the first portion of the spent first catalyst to the regenerated catalyst of from 1:99 to 99:1, or from 10:90 to 90:10, or from 25:75 to 75:25.

A fiftieth aspect of the present disclosure may include the forty-first through forty-ninth aspects further comprising mixing the first catalyst with the greater boiling point fraction before cracking the at least a portion of the greater boiling point fraction.

A fifty-first aspect of the present disclosure may include the forty-first through fiftieth aspects further comprising mixing the second catalyst with the lesser boiling point fraction before cracking the at least a portion of the lesser boiling point fraction.

A fifty-second aspect of the present disclosure may include the forty-first through fifty-first aspects where the greater boiling point fraction and the lesser boiling point fraction are cracked under high-severity conditions comprising a weight ratio of catalyst to hydrocarbon of greater than 5:1 and a residence time of less than 3 seconds.

A fifty-third aspect of the present disclosure is directed to a system for producing olefins from crude oil, the system comprising: a first FCC unit comprising a first cracking reaction zone, the first cracking reaction zone being a downflow cracking reaction zone; a first separation zone downstream of the first FCC unit; a second FCC unit in parallel with the first FCC unit and comprising a second cracking reaction zone, the second cracking reaction zone being a downflow cracking reaction zone; a second separation zone downstream of the second FCC unit; a regeneration zone downstream of the first separation zone and the second separation zone and fluidly coupled to the first separation zone and the second separation zone; and a catalyst recycle fluidly coupling the first separation zone or the second separation zone to the first FCC unit, the second FCC unit, or the first FCC unit and the second FCC unit.

A fifty-fourth aspect of the present disclosure may include the fifty-third aspect where the first FCC unit comprises a first mixing zone upstream of the first cracking reaction zone and fluidly coupled with the first cracking reaction zone.

A fifty-fifth aspect of the present disclosure may include the fifty-third through fifty-fourth aspects where the second FCC unit comprises a second mixing zone upstream of the second cracking reaction zone and fluidly coupled with the second cracking reaction zone.

A fifty-sixth aspect of the present disclosure may include the fifty-third through fifty-fifth aspects further comprising a catalyst hopper disposed downstream of the regeneration zone and fluidly coupled with the regeneration zone.

A fifty-seventh aspect of the present disclosure may include the fifty-sixth aspect where the catalyst hopper is fluidly coupled to the first FCC unit and the second FCC unit.

A fifty-eighth aspect of the present disclosure may include the fifty-third through fifty-seventh aspects further comprising a first stripping zone downstream of the first separation zone and fluidly coupled to the first separation zone.

A fifty-ninth aspect of the present disclosure may include the fifty-third through fifty-eighth aspects further comprising a second stripping zone downstream of the second separation zone and fluidly coupled to the second separation zone.

A sixtieth aspect of the present disclosure may include the fifty-third through fifty-ninth aspects further comprising a feed separator having an inlet, a greater boiling point fraction outlet stream, and a lesser boiling point fraction outlet stream, where the greater boiling point fraction outlet stream is fluidly coupled to the first FCC unit and the lesser boiling point fraction outlet stream is fluidly coupled to the second FCC unit.

A sixty-first aspect of the present disclosure may include the fifty-third through sixtieth aspects where the catalyst recycle fluidly couples the first separation zone to the first FCC unit, the second FCC unit, or both the first FCC unit and the second FCC unit.

A sixty-second aspect of the present disclosure may include the sixty-first aspect where the catalyst recycle fluidly couples the first separation zone to the first FCC unit.

A sixty-third aspect of the present disclosure may include the sixty-first aspect where the catalyst recycle fluidly couples the first separation zone to the second FCC unit.

A sixty-fourth aspect of the present disclosure may include the fifty-third through sixtieth aspects where the catalyst recycle fluidly couples the second separation zone to the first FCC unit, the second FCC unit, or both the first FCC unit and the second FCC unit.

A sixty-fifth aspect of the present disclosure may include the sixty-fourth aspect where the catalyst recycle fluidly couples the second separation zone to the first FCC unit.

A sixty-sixth aspect of the present disclosure may include the sixty-fourth aspect where catalyst recycle fluidly couples the second separation zone to the second FCC unit.

For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for operating a system having a first fluid catalytic cracking (FCC) unit and a second FCC unit for producing products from a hydrocarbon feed stream, the method comprising:
   introducing the hydrocarbon feed stream to a feed separator;
   separating the hydrocarbon feed stream into a lesser boiling point fraction and a greater boiling point fraction in the feed separator;
   passing the greater boiling point fraction to the first FCC unit;
   passing the lesser boiling point fraction to the second FCC unit, where the first FCC unit and the second FCC unit are downflow FCC units;
   cracking at least a portion of the greater boiling point fraction in the first FCC unit in the presence of a first catalyst at a first cracking temperature of from 500° C. to 700° C. to produce a first cracking reaction product and a spent first catalyst;
   cracking at least a portion of the lesser boiling point fraction in the second FCC unit in the presence of a second catalyst and at a second cracking temperature of from 500° C. to 700° C. to produce a second cracking reaction product and a spent second catalyst;
   passing the at least a portion of the spent second catalyst to the first FCC unit where the first catalyst comprises the at least a portion of the spent second catalyst and a regenerated catalyst; and
   controlling a catalytic activity of the first catalyst in the first FCC unit or the first cracking temperature in the first FCC unit by adjusting a weight ratio of the at least a portion of the spent second catalyst to the regenerated catalyst in the first catalyst;
   where the cracking of the at least a portion of the greater boiling point fraction is in the presence of steam, the cracking of the at least a portion of the lesser boiling point fraction is in the presence of steam, or both.

2. The method of claim 1, where the hydrocarbon feed stream comprises crude oil.

3. The method of claim 1, where the first FCC unit and the second FCC unit are High-Severity Fluidized Catalytic Cracking (HSFCC) units.

4. The method of claim 3, where a weight ratio of catalyst to hydrocarbon in the first FCC unit and the second FCC unit is greater than 5 and a residence time in the first FCC unit and the second FCC unit is less than 3 seconds.

5. The method of claim 1, where the first cracking reaction product or the second cracking reaction product comprises one or more of ethylene, propene, butene, or pentene.

6. A method for operating a system having a first fluid catalytic cracking (FCC) unit and a second FCC unit for producing products from a hydrocarbon feed stream, the method comprising:
   introducing the hydrocarbon feed stream to a feed separator;
   separating the hydrocarbon feed stream into a lesser boiling point fraction and a greater boiling point fraction in the feed separator;
   passing the greater boiling point fraction to the first FCC unit;
   passing the lesser boiling point fraction to the second FCC unit, where the first FCC unit and the second FCC unit are downflow FCC units;
   cracking at least a portion of the greater boiling point fraction in the first FCC unit in the presence of a first catalyst at a first cracking temperature of from 500° C. to 700° C. to produce a first cracking reaction product and a spent first catalyst;
   cracking at least a portion of the lesser boiling point fraction in the second FCC unit in the presence of a second catalyst and at a second cracking temperature of from 500° C. to 700° C. to produce a second cracking reaction product and a spent second catalyst;

passing at least a portion of the spent first catalyst or the spent second catalyst to the first FCC unit;

mixing the at least a portion of the spent first catalyst or spent second catalyst, a regenerated catalyst, and the greater boiling point fraction in a mixing zone positioned upstream of a cracking reaction zone of the first FCC unit, where the first catalyst comprises the regenerated catalyst and the at least a portion of the spent first catalyst or spent second catalyst;

passing the at least a portion of the spent second catalyst to the first FCC unit where the first catalyst comprises the at least a portion of the spent second catalyst and the regenerated catalyst; and controlling a catalytic activity of the first catalyst in the first FCC unit or the first cracking temperature in the first FCC unit by adjusting a weight ratio of the at least a portion of the spent second catalyst to the regenerated catalyst in the first catalyst, where the cracking of the at least a portion of the greater boiling point fraction is in the presence of steam, the cracking of the at least a portion of the lesser boiling point fraction is in the presence of steam, or both.

7. The method of claim 6 where the hydrocarbon feed stream comprises crude oil.

8. The method of claim 6 further comprising regenerating a non-recycled portion of the spent first catalyst and a non-recycled portion of the spent second catalyst in a regeneration zone to produce the regenerated catalyst.

9. The method of claim 6 comprising passing the at least a portion of the spent first catalyst to the first FCC unit where the first catalyst comprises the at least a portion of the spent first catalyst and the regenerated catalyst.

10. The method of claim 9 where the first catalyst comprises a weight ratio of the at least a portion of the spent first catalyst to the regenerated catalyst of from 1:99 to 99:1.

11. The method of claim 9 further comprising controlling a catalytic activity of the first catalyst in the first FCC unit or the first cracking temperature in the first FCC unit by adjusting a weight ratio of the at least a portion of the spent first catalyst to the regenerated catalyst in the first catalyst.

12. The method of claim 6 where the first catalyst comprises a weight ratio of the at least a portion of the spent second catalyst to the regenerated catalyst of from 1:99 to 99:1.

13. The method of claim 6 where the first cracking reaction product or the second cracking reaction product comprises one or more of ethylene, propene, butene, or pentene.

14. A method for producing olefins, the method comprising:

separating a hydrocarbon material into a lesser boiling point fraction and a greater boiling point fraction;

cracking at least a portion of the greater boiling point fraction in the presence of a first catalyst in a first FCC unit at a first cracking temperature of from 500° C. to 700° C. to produce a first cracking reaction product and a spent first catalyst;

cracking at least a portion of the lesser boiling point fraction in the presence of a second catalyst in a second FCC unit at a second cracking temperature of from 500° C. to 700° C. to produce a second cracking reaction product and a spent second catalyst;

separating at least a portion of the first cracking reaction product from the spent first catalyst;

separating at least a portion of the second cracking reaction product from the spent second catalyst;

mixing at least a portion of the spent first catalyst or at least a portion of the spent second catalyst, a regenerated catalyst, and the greater boiling point fraction or the lesser boiling point fraction, where the first catalyst comprises at least a portion of the spent first catalyst or at least a portion of the spent second catalyst and the regenerated catalyst, wherein the second catalyst comprises at least a portion of the spent first catalyst or at least a portion of the spent second catalyst and the regenerated catalyst;

passing the at least a portion of the spent second catalyst to the first FCC unit where the first catalyst comprises the at least a portion of the spent second catalyst and the regenerated catalyst;

controlling a catalytic activity of the first catalyst in the first FCC unit or the first cracking temperature in the first FCC unit by adjusting a weight ratio of the at least a portion of the spent second catalyst to the regenerated catalyst in the first catalyst; and recovering the first cracking reaction product and the second cracking reaction product, where the cracking of the at least a portion of the greater boiling point fraction is in the presence of steam, the cracking of the at least a portion of the lesser boiling point fraction is in the presence of steam, or both.

15. The method of claim 14, comprising mixing at least a portion of the spent first catalyst, the regenerated catalyst, and the greater boiling point fraction before cracking the at least a portion of the greater boiling point fraction, wherein the first catalyst comprises the at least a portion of the spent first catalyst and the regenerated catalyst.

16. The method of claim 14, comprising mixing at least a portion of the spent first catalyst, the regenerated catalyst, and the lesser boiling point fraction before cracking the at least a portion of the lesser boiling point fraction, wherein the second catalyst comprises the at least a portion of the spent first catalyst and the regenerated catalyst.

17. The method of claim 14, comprising mixing at least a portion of the spent second catalyst, the regenerated catalyst, and the greater boiling point fraction before cracking the at least a portion of the greater boiling point fraction, wherein the first catalyst comprises the at least a portion of the spent second catalyst and the regenerated catalyst.

18. The method of claim 14, comprising mixing at least a portion of the spent second catalyst, the regenerated catalyst, and the lesser boiling point fraction before cracking the at least a portion of the lesser boiling point fraction, wherein the second catalyst comprises the at least a portion of the spent second catalyst and the regenerated catalyst.

\* \* \* \* \*